(12) United States Patent
Visco et al.

(10) Patent No.: US 12,237,511 B2
(45) Date of Patent: Feb. 25, 2025

(54) GLASSY EMBEDDED SOLID-STATE ELECTRODE ASSEMBLIES, SOLID-STATE BATTERIES AND METHODS OF MAKING ELECTRODE ASSEMBLIES AND SOLID-STATE BATTERIES

(71) Applicant: PolyPlus Battery Company, Berkeley, CA (US)

(72) Inventors: Steven J. Visco, Berkeley, CA (US); Yevgeniy S. Nimon, Berkeley, CA (US); Bruce D. Katz, Berkeley, CA (US); Vitaliy Nimon, Berkeley, CA (US)

(73) Assignee: PolyPlus Battery Company, Berkeley, CA (US)

( * ) Notice: Subject to any disclaimer, the term of this patent is extended or adjusted under 35 U.S.C. 154(b) by 0 days.

(21) Appl. No.: 18/671,772

(22) Filed: May 22, 2024

(65) Prior Publication Data

US 2024/0347731 A1 Oct. 17, 2024

Related U.S. Application Data

(62) Division of application No. 17/303,707, filed on Jun. 4, 2021, now Pat. No. 12,021,238.

(Continued)

(51) Int. Cl.
*H01M 4/00* (2006.01)
*H01M 4/04* (2006.01)
(Continued)

(52) U.S. Cl.
CPC .......... *H01M 4/62* (2013.01); *H01M 4/0471* (2013.01); *H01M 10/0525* (2013.01);
(Continued)

(58) Field of Classification Search
CPC .......... H01M 4/62; H01M 2300/0068; H01M 2004/028; H01M 10/0562; H01M 10/0525; H01M 4/0471; Y02E 60/10
See application file for complete search history.

(56) References Cited

U.S. PATENT DOCUMENTS 3,994,676 A 11/1976 Strimple et al.
4,037,043 A 7/1977 Segsworth
(Continued)

FOREIGN PATENT DOCUMENTS

BR 112017011548 A2 7/2018
BR 112017011768 A2 7/2018
(Continued)

OTHER PUBLICATIONS

Akridge, James R. et al., "Solid state batteries using vitreous solid electrolytes," Solid State Ionics 18 & 19 (1986) 1082-1087.
(Continued)

*Primary Examiner* — Anca Eoff
*Assistant Examiner* — Monique M Wills
(74) *Attorney, Agent, or Firm* — Weaver Austin Villeneuve & Sampson LLP

(57) ABSTRACT

Batteries, component structures and manufacturing methods, in particular including a glassy embedded battery electrode assembly having a composite material structure composed of interpenetrating material components including a porous electroactive network including a solid electroactive material, and a continuous glassy medium including a Li ion conducting sulfide glass, can achieve enhanced power output, reduced charging time and/or improved cycle life.

9 Claims, 19 Drawing Sheets

Related U.S. Application Data

(60) Provisional application No. 63/198,579, filed on Oct. 28, 2020, provisional application No. 63/198,447, filed on Oct. 19, 2020, provisional application No. 62/706,831, filed on Sep. 11, 2020, provisional application No. 62/706,775, filed on Sep. 9, 2020, provisional application No. 63/068,938, filed on Aug. 21, 2020, provisional application No. 63/061,123, filed on Aug. 4, 2020.

(51) Int. Cl.
*H01M 4/62* (2006.01)
*H01M 10/0525* (2010.01)
*H01M 10/0562* (2010.01)
*H01M 4/02* (2006.01)

(52) U.S. Cl.
CPC .. *H01M 10/0562* (2013.01); *H01M 2004/028* (2013.01); *H01M 2300/0068* (2013.01)

(56) References Cited

U.S. PATENT DOCUMENTS

| | | |
|---|---|---|
| 4,042,482 A | 8/1977 | Shannon et al. |
| 4,090,054 A | 5/1978 | Heine et al. |
| 4,121,985 A | 10/1978 | Cherenko |
| 4,208,474 A | 6/1980 | Jacobson et al. |
| 4,331,750 A | 5/1982 | Malugani et al. |
| 4,444,857 A | 4/1984 | Duchange et al. |
| 4,447,393 A | 5/1984 | Weirauch |
| 4,465,745 A | 8/1984 | Akridge |
| 4,465,746 A | 8/1984 | Akridge |
| 4,477,545 A | 10/1984 | Akridge et al. |
| 4,478,920 A | 10/1984 | Gabano et al. |
| 4,513,070 A | 4/1985 | Carette et al. |
| 4,529,027 A | 7/1985 | Brice et al. |
| 4,585,714 A | 4/1986 | Akridge |
| 4,599,284 A | 7/1986 | Akridge |
| 4,601,961 A | 7/1986 | McCartney |
| 4,735,850 A | 4/1988 | Eitman |
| 4,806,439 A | 2/1989 | Wessling et al. |
| 4,863,553 A | 9/1989 | Lehoczky et al. |
| 4,863,798 A | 9/1989 | Arenz et al. |
| 4,985,317 A | 1/1991 | Adachi et al. |
| 5,246,782 A | 9/1993 | Kennedy et al. |
| 5,314,765 A | 5/1994 | Bates |
| 5,338,625 A | 8/1994 | Bates et al. |
| 5,424,147 A | 6/1995 | Khasin et al. |
| 5,455,126 A | 10/1995 | Bates et al. |
| 5,512,147 A | 4/1996 | Bates et al. |
| 5,523,178 A | 6/1996 | Murakami et al. |
| 5,567,210 A | 10/1996 | Bates et al. |
| 5,569,520 A | 10/1996 | Bates |
| 5,582,623 A | 12/1996 | Chu |
| 5,597,660 A | 1/1997 | Bates et al. |
| 5,612,152 A | 3/1997 | Bates |
| 5,648,187 A | 7/1997 | Skotheim |
| 5,686,201 A | 11/1997 | Chu |
| 5,702,995 A | 12/1997 | Fu |
| 5,814,420 A | 9/1998 | Chu |
| 5,824,434 A | 10/1998 | Kawakami et al. |
| 5,958,281 A | 9/1999 | Takada et al. |
| 5,961,672 A | 10/1999 | Skotheim et al. |
| 6,030,909 A | 2/2000 | Fu |
| 6,042,739 A | 3/2000 | Itoh |
| 6,214,061 B1 | 4/2001 | Visco et al. |
| 6,315,881 B1 | 11/2001 | Fu |
| 6,402,795 B1 | 6/2002 | Chu et al. |
| 6,405,565 B1 | 6/2002 | Aitken et al. |
| 6,413,285 B1 | 7/2002 | Chu et al. |
| 6,432,584 B1 | 8/2002 | Visco et al. |
| 6,479,028 B1 | 11/2002 | Kaner et al. |
| 6,485,622 B1 | 11/2002 | Fu |
| 6,723,140 B2 | 4/2004 | Chu et al. |
| 6,733,924 B1 | 5/2004 | Skotheim et al. |
| 6,797,428 B1 | 9/2004 | Skotheim et al. |
| 7,211,532 B2 | 5/2007 | Fu |
| 7,247,408 B2 | 7/2007 | Skotheim et al. |
| 7,273,682 B2 | 9/2007 | Park et al. |
| 7,282,295 B2 | 10/2007 | Visco et al. |
| 7,282,296 B2 | 10/2007 | Visco et al. |
| 7,282,302 B2 | 10/2007 | Visco et al. |
| 7,390,591 B2 | 6/2008 | Visco et al. |
| 7,645,543 B2 | 1/2010 | Visco et al. |
| 7,666,233 B2 | 2/2010 | Visco et al. |
| 7,824,806 B2 | 11/2010 | Visco et al. |
| 7,829,212 B2 | 11/2010 | Visco et al. |
| 7,838,144 B2 | 11/2010 | Visco et al. |
| 7,858,223 B2 | 12/2010 | Visco et al. |
| 8,012,631 B2 | 9/2011 | Seino et al. |
| 8,048,570 B2 | 11/2011 | Visco et al. |
| 8,048,571 B2 | 11/2011 | Visco et al. |
| 8,088,697 B2 | 1/2012 | Yuh et al. |
| 8,092,941 B2 | 1/2012 | Weppner et al. |
| 8,114,171 B2 | 2/2012 | Visco et al. |
| 8,129,052 B2 | 3/2012 | Visco et al. |
| 8,182,943 B2 | 5/2012 | Visco et al. |
| 8,202,649 B2 | 6/2012 | Visco et al. |
| 8,293,398 B2 | 10/2012 | Visco et al. |
| 8,304,019 B1 | 11/2012 | Pichler |
| 8,304,115 B1 | 11/2012 | Petkov et al. |
| 8,323,820 B2 | 12/2012 | Visco et al. |
| 8,334,075 B2 | 12/2012 | Visco et al. |
| 8,389,147 B2 | 3/2013 | Visco et al. |
| 8,404,388 B2 | 3/2013 | Visco et al. |
| 8,445,136 B2 | 5/2013 | Visco et al. |
| 8,455,131 B2 | 6/2013 | Visco et al. |
| 8,501,339 B2 | 8/2013 | Visco et al. |
| 8,556,197 B2 | 10/2013 | Hama et al. |
| 8,652,686 B2 | 2/2014 | Visco et al. |
| 8,658,304 B2 | 2/2014 | Visco et al. |
| 8,658,317 B2 | 2/2014 | Weppner et al. |
| 8,673,477 B2 | 3/2014 | Visco et al. |
| 8,691,444 B2 | 4/2014 | Visco et al. |
| 8,691,928 B2 | 4/2014 | Hsieh et al. |
| 8,778,522 B2 | 7/2014 | Visco et al. |
| 8,778,543 B2 | 7/2014 | Shinohara et al. |
| 8,828,573 B2 | 9/2014 | Visco et al. |
| 8,828,574 B2 | 9/2014 | Visco et al. |
| 8,828,575 B2 | 9/2014 | Visco et al. |
| 8,828,580 B2 | 9/2014 | Visco et al. |
| 8,923,360 B2 | 12/2014 | Coleman et al. |
| 9,077,041 B2 * | 7/2015 | Burnside .............. H01M 4/13 |
| 9,123,941 B2 | 9/2015 | Visco et al. |
| 9,130,198 B2 | 9/2015 | Visco et al. |
| 9,136,568 B2 | 9/2015 | Visco et al. |
| 9,287,573 B2 | 3/2016 | Visco et al. |
| 9,321,652 B2 | 4/2016 | Paquette et al. |
| 9,362,538 B2 | 6/2016 | Visco et al. |
| 9,379,368 B2 | 6/2016 | Roumi |
| 9,598,769 B2 | 3/2017 | Elam et al. |
| 9,601,779 B2 | 3/2017 | Visco et al. |
| 9,660,265 B2 | 5/2017 | Visco et al. |
| 9,905,860 B2 | 2/2018 | Visco et al. |
| 10,147,968 B2 | 12/2018 | Visco et al. |
| 10,164,289 B2 | 12/2018 | Visco et al. |
| 10,601,071 B2 | 3/2020 | Visco et al. |
| 10,629,950 B2 | 4/2020 | Visco et al. |
| 10,707,536 B2 | 7/2020 | Visco et al. |
| 10,833,361 B2 | 11/2020 | Visco et al. |
| 10,840,546 B2 | 11/2020 | Visco et al. |
| 10,840,547 B2 | 11/2020 | Visco et al. |
| 10,862,171 B2 | 12/2020 | Visco et al. |
| 10,868,293 B2 | 12/2020 | Visco et al. |
| 10,916,753 B2 | 2/2021 | Visco et al. |
| 11,171,364 B2 | 11/2021 | Visco et al. |
| 11,174,190 B2 | 11/2021 | Valli et al. |
| 11,239,495 B2 | 2/2022 | Visco et al. |
| 11,444,270 B2 | 9/2022 | Visco et al. |
| 11,631,889 B2 | 4/2023 | Visco et al. |
| 11,646,444 B2 | 5/2023 | Visco et al. |
| 11,646,445 B2 | 5/2023 | Visco et al. |
| 11,749,834 B2 | 9/2023 | Visco et al. |

(56) References Cited

U.S. PATENT DOCUMENTS

| | | |
|---|---|---|
| 11,817,569 B2 | 11/2023 | Visco et al. |
| 11,876,174 B2 | 1/2024 | Visco et al. |
| 11,984,553 B2 | 5/2024 | Visco et al. |
| 12,021,187 B2 | 6/2024 | Visco et al. |
| 12,021,238 B2 | 6/2024 | Visco et al. |
| 12,034,116 B2 | 7/2024 | Visco et al. |
| 12,051,824 B2 | 7/2024 | Visco et al. |
| 2002/0012846 A1 | 1/2002 | Skotheim et al. |
| 2002/0036131 A1 | 3/2002 | Kugai et al. |
| 2002/0182508 A1 | 12/2002 | Nimon et al. |
| 2003/0099884 A1 | 5/2003 | Chiang et al. |
| 2003/0134734 A1 | 7/2003 | Nishimoto et al. |
| 2004/0005504 A1 | 1/2004 | Kugai et al. |
| 2004/0200519 A1 | 10/2004 | Sterzel et al. |
| 2005/0063652 A1 | 3/2005 | Johnson et al. |
| 2005/0107239 A1 | 5/2005 | Akiba et al. |
| 2006/0222954 A1 | 10/2006 | Skotheim et al. |
| 2007/0037058 A1 | 2/2007 | Visco et al. |
| 2007/0059533 A1 | 3/2007 | Burdette et al. |
| 2007/0087269 A1 | 4/2007 | Inda |
| 2007/0119212 A1 | 5/2007 | Huang et al. |
| 2007/0148533 A1 | 6/2007 | Anglin et al. |
| 2007/0160911 A1 | 7/2007 | Senga et al. |
| 2007/0207186 A1 | 9/2007 | Scanlon et al. |
| 2007/0231704 A1 | 10/2007 | Inda |
| 2007/0248888 A1 | 10/2007 | Seino et al. |
| 2007/0271957 A1 | 11/2007 | Nakamura et al. |
| 2007/0281089 A1 | 12/2007 | Heller et al. |
| 2007/0295385 A1 | 12/2007 | Sheats et al. |
| 2008/0057386 A1 | 3/2008 | Visco et al. |
| 2008/0057399 A1 | 3/2008 | Visco et al. |
| 2008/0318132 A1 | 12/2008 | Visco et al. |
| 2009/0100874 A1 | 4/2009 | Tateishi et al. |
| 2009/0117460 A1 | 5/2009 | Isaacson et al. |
| 2009/0142669 A1 | 6/2009 | Shinohara et al. |
| 2009/0159839 A1 | 6/2009 | Seino et al. |
| 2009/0297935 A1 | 12/2009 | Visco et al. |
| 2010/0022378 A1 | 1/2010 | Nguyen et al. |
| 2010/0040952 A1 | 2/2010 | Kimura et al. |
| 2010/0075209 A1 | 3/2010 | Kimura et al. |
| 2010/0135706 A1 | 6/2010 | Miki et al. |
| 2010/0190063 A1 | 7/2010 | Fukumoto et al. |
| 2011/0065007 A1 | 3/2011 | Kamiya et al. |
| 2011/0076570 A1 | 3/2011 | Hama et al. |
| 2011/0108642 A1 | 5/2011 | Hama et al. |
| 2011/0117726 A1 | 5/2011 | Pinnington et al. |
| 2011/0269007 A1 | 11/2011 | Visco et al. |
| 2012/0034529 A1 | 2/2012 | Tatsumisago et al. |
| 2012/0077020 A1 | 3/2012 | Muramatsu et al. |
| 2012/0094188 A1 | 4/2012 | Visco et al. |
| 2012/0177997 A1 | 7/2012 | Nakamoto et al. |
| 2012/0183834 A1 | 7/2012 | Kanda et al. |
| 2012/0183880 A1 | 7/2012 | Toussaint et al. |
| 2012/0189918 A1 | 7/2012 | Tatsumisago et al. |
| 2012/0204601 A1 | 8/2012 | Murakami |
| 2012/0309157 A1 | 12/2012 | Iwamatsu et al. |
| 2012/0315482 A1 | 12/2012 | Muramatsu et al. |
| 2013/0164631 A1 | 6/2013 | Ohtomo et al. |
| 2013/0164632 A1 | 6/2013 | Kato et al. |
| 2013/0288134 A1 | 10/2013 | Hama et al. |
| 2014/0072875 A1 | 3/2014 | Uchiyama |
| 2014/0090421 A1 | 4/2014 | Shock et al. |
| 2014/0093785 A1 | 4/2014 | Sugiura et al. |
| 2014/0141341 A1 | 5/2014 | Ohtomo et al. |
| 2014/0151371 A1 | 6/2014 | Chang et al. |
| 2014/0154586 A1 | 6/2014 | Hayashi et al. |
| 2014/0162108 A1 | 6/2014 | Visco et al. |
| 2014/0170465 A1 | 6/2014 | Visco et al. |
| 2014/0186785 A1 | 7/2014 | Mellen |
| 2014/0272524 A1 | 9/2014 | Visco et al. |
| 2014/0322584 A1 | 10/2014 | Visco et al. |
| 2014/0339194 A1 | 11/2014 | Gu et al. |
| 2015/0068251 A1 | 3/2015 | Ottermann et al. |
| 2015/0107510 A1 | 4/2015 | Lindfors |
| 2015/0138636 A1 | 5/2015 | O'Reilly et al. |
| 2015/0171431 A1 | 6/2015 | Yamada et al. |
| 2015/0214555 A1 | 7/2015 | Visco et al. |
| 2015/0291753 A1 | 10/2015 | Tsukamura et al. |
| 2015/0293347 A1 | 10/2015 | Kreit et al. |
| 2015/0340720 A1 | 11/2015 | Visco et al. |
| 2015/0344342 A1 | 12/2015 | Nguyen et al. |
| 2015/0349371 A1 | 12/2015 | Neudecker et al. |
| 2016/0028053 A1 | 1/2016 | Visco et al. |
| 2016/0028063 A1 | 1/2016 | Visco et al. |
| 2016/0072153 A1 | 3/2016 | Ichikawa et al. |
| 2016/0133989 A1 | 5/2016 | Suzuki et al. |
| 2016/0156065 A1 | 6/2016 | Visco et al. |
| 2016/0190640 A1 | 6/2016 | Visco et al. |
| 2016/0197326 A1 | 7/2016 | Visco et al. |
| 2016/0211547 A1 | 7/2016 | Hwang et al. |
| 2016/0218349 A1 | 7/2016 | Hasegawa et al. |
| 2016/0257593 A1 | 9/2016 | Nguyen et al. |
| 2016/0261002 A1 | 9/2016 | Trevey et al. |
| 2016/0351878 A1 | 12/2016 | Visco et al. |
| 2016/0351879 A1 | 12/2016 | Visco et al. |
| 2017/0117549 A1 | 4/2017 | Hintennach |
| 2017/0229731 A1 | 8/2017 | Visco et al. |
| 2017/0288228 A1 | 10/2017 | Ito et al. |
| 2017/0309899 A1 | 10/2017 | Son et al. |
| 2017/0331156 A1 | 11/2017 | Visco et al. |
| 2017/0355632 A1 | 12/2017 | McEnroe et al. |
| 2017/0365853 A1 | 12/2017 | Visco et al. |
| 2018/0108909 A1 | 4/2018 | Su et al. |
| 2018/0131040 A1 | 5/2018 | Visco et al. |
| 2018/0309157 A1 | 10/2018 | Visco et al. |
| 2018/0337413 A1 | 11/2018 | Sassen et al. |
| 2019/0013546 A1 | 1/2019 | Visco et al. |
| 2019/0148768 A1 | 5/2019 | Visco et al. |
| 2019/0173128 A1 | 6/2019 | Visco et al. |
| 2019/0177878 A1 | 6/2019 | Kanatzidis et al. |
| 2019/0181496 A1 | 6/2019 | Visco et al. |
| 2019/0194052 A1 | 6/2019 | Nguyen et al. |
| 2019/0229370 A1 | 7/2019 | Visco et al. |
| 2019/0237801 A1 | 8/2019 | Kanno et al. |
| 2019/0237810 A1 | 8/2019 | Visco et al. |
| 2019/0241455 A1 | 8/2019 | Sweney et al. |
| 2019/0276356 A1 | 9/2019 | Abbott et al. |
| 2019/0305370 A1 | 10/2019 | Minamida |
| 2020/0014063 A1 | 1/2020 | Visco et al. |
| 2020/0028209 A1 | 1/2020 | Visco et al. |
| 2020/0123038 A1 | 4/2020 | Jud et al. |
| 2020/0127275 A1 | 4/2020 | Visco et al. |
| 2020/0243902 A1 | 7/2020 | Visco et al. |
| 2020/0251773 A1 | 8/2020 | Visco et al. |
| 2020/0395633 A1 | 12/2020 | Visco et al. |
| 2021/0098818 A1 | 4/2021 | Visco et al. |
| 2021/0098819 A1 | 4/2021 | Visco et al. |
| 2021/0111427 A1 | 4/2021 | Visco et al. |
| 2021/0126236 A1 | 4/2021 | Visco et al. |
| 2021/0218005 A1 | 7/2021 | Matzner et al. |
| 2021/0218055 A1 | 7/2021 | Visco et al. |
| 2021/0320328 A1 | 10/2021 | Visco et al. |
| 2021/0340048 A1 | 11/2021 | Visco et al. |
| 2021/0380456 A1 | 12/2021 | Visco et al. |
| 2021/0395128 A1 | 12/2021 | Visco et al. |
| 2022/0013857 A1 | 1/2022 | Visco et al. |
| 2022/0045328 A1 | 2/2022 | Visco et al. |
| 2022/0045352 A1 | 2/2022 | Visco et al. |
| 2022/0045353 A1 | 2/2022 | Visco et al. |
| 2022/0216509 A1 | 7/2022 | Sasaki et al. |
| 2022/0263137 A1 | 8/2022 | Visco et al. |
| 2022/0302492 A1 | 9/2022 | Visco et al. |
| 2022/0320573 A1 | 10/2022 | Visco et al. |
| 2022/0320579 A1 | 10/2022 | Visco et al. |
| 2022/0328865 A1 | 10/2022 | Visco et al. |
| 2022/0328866 A1 | 10/2022 | Visco et al. |
| 2022/0336849 A1 | 10/2022 | Visco et al. |
| 2022/0396516 A1 | 12/2022 | Visco et al. |
| 2022/0399567 A1 | 12/2022 | Visco et al. |
| 2023/0091921 A1 | 3/2023 | Visco et al. |
| 2023/0098257 A1 | 3/2023 | Visco et al. |
| 2023/0299336 A1 | 9/2023 | Visco et al. |
| 2023/0335786 A1 | 10/2023 | Visco et al. |
| 2023/0335789 A1 | 10/2023 | Visco et al. |

(56) References Cited

U.S. PATENT DOCUMENTS

| | | | |
|---|---|---|---|
| 2023/0420634 | A1 | 12/2023 | Visco et al. |
| 2024/0088359 | A1 | 3/2024 | Visco et al. |
| 2024/0088433 | A1 | 3/2024 | Visco et al. |
| 2024/0092676 | A1 | 3/2024 | Visco et al. |
| 2024/0283011 | A1 | 8/2024 | Visco et al. |
| 2024/0347763 | A1 | 10/2024 | Visco et al. |
| 2024/0347764 | A1 | 10/2024 | Visco et al. |
| 2024/0363895 | A1 | 10/2024 | Visco et al. |
| 2024/0405263 | A1 | 12/2024 | Visco et al. |

FOREIGN PATENT DOCUMENTS

| | | | |
|---|---|---|---|
| CN | 101346424 | A | 1/2009 |
| CN | 101494299 | A | 7/2009 |
| CN | 101535039 | A | 9/2009 |
| EP | 0774654 | B1 | 1/2000 |
| EP | 3227952 | A1 | 10/2017 |
| JP | 2004063419 | A | 2/2004 |
| JP | 2004127743 | A | 4/2004 |
| JP | 2007311084 | A | 11/2007 |
| JP | 2008103229 | A | 5/2008 |
| JP | 2008103258 | A | 5/2008 |
| JP | 2008300300 | A | 12/2008 |
| JP | 2009158476 | A | 7/2009 |
| JP | 2009252670 | A | 10/2009 |
| JP | 2010108881 | A | 5/2010 |
| JP | 2010123463 | A | 6/2010 |
| JP | 2012043654 | A | 3/2012 |
| JP | 2012089244 | A | 5/2012 |
| JP | 2012089424 | A | 5/2012 |
| JP | 2012096973 | A | 5/2012 |
| JP | 2013117398 | A | 6/2013 |
| JP | 2013232335 | A | 11/2013 |
| JP | 2014035989 | A | 2/2014 |
| JP | 2014096311 | A | 5/2014 |
| JP | 2014127272 | A | 7/2014 |
| JP | 2014221714 | A | 11/2014 |
| KR | 20140011258 | A | 1/2014 |
| WO | WO-9801401 | A1 | 1/1998 |
| WO | WO-2009003695 | A2 | 1/2009 |
| WO | WO-2009094524 | A1 | 7/2009 |
| WO | WO-2012017544 | A1 | 2/2012 |
| WO | WO-2013141481 | A1 | 9/2013 |
| WO | WO-2016089897 | A1 | 6/2016 |
| WO | WO-2016089899 | A1 | 6/2016 |
| WO | WO-2017112550 | A1 | 6/2017 |
| WO | WO-2017197039 | A1 | 11/2017 |
| WO | WO-2018141919 | A1 | 8/2018 |
| WO | WO-2019010047 | A1 | 1/2019 |
| WO | WO-2019018386 | A1 | 1/2019 |
| WO | WO-2019121340 | A1 | 6/2019 |

OTHER PUBLICATIONS

Bartholomew, Roger F. et al., "Electrical properties of new glasses based on the Li2S—SiS2 system," Journal of Non-Crystalline Solids 256&257 (1999) 242-247.
Bates, J.B. et al., "Electrical properties of amorphous lithium electrolyte thin films," 1992, Solid State Ionics.
Bates, J.B. et al., "Thin-film rechargeable lithium batteries," 1995, Journal of Power Sources.
Bertschler, Eva-Maria et al., "Li+ Ion Conductors with Adamantane-Type Nitridophosphate Anions β-Li10P4N10 and Li13P4N10X3 with X=Cl, Br", Chemistry: A European Journal, vol. 24, Issue 1, (Jan. 2, 2018), pp. 196-205.
BR Office Action dated Aug. 3, 2022, in Application No. BR112017011768-1 awaiting English translation.
BR Office Action dated Aug. 3, 2022, in Application No. BR112017011768-1.
BR Office Action dated Mar. 28, 2022 in Application No. BR20171111548 with English translation.
BR Office Action dated Mar. 28, 2022 in Application No. BR20171111768 with English translation.
Burckhardt, W. et al., "Fast Li+ ion transport in iodine-thioborate glasses," Mat. Res. Bull., vol. 19, pp. 1083-1089, 1984.
CA Office Action dated May 31, 2022, in Application No. CA2969113.
CA Office Action dated Oct. 7, 2021, in application No. CA2,969,117.
Cao, C. et al., "Recent advances in inorganic solid electrolytes for lithium batteries," Frontiers in Energy Research, Jun. 27, 2014, vol. 2, No. 25, pp. 1-10.
CN Office Action dated Feb. 3, 2019, CN Application No. 201580075233.0 with English Translation.
Communication Pursuant to Article 94(3) EPC, First Office Action, dated May 13, 2019, for European Patent Application No. 15864779.2.
Communication Pursuant to Rules 161(2) and 162 EPC, (request for extra claims fees), dated Aug. 4, 2017, for European Patent Application No. 15864779.2.
Communication Pursuant to Rules 70(2) and 70a(2), dated Jun. 8, 2018, deadline for response to Extended European Search Report, for European Patent Application No. 15864779.2.
Decision for Grant, dated Sep. 29, 2020, for Japanese Patent Application No. 2017-529785, with translation.
EP Search Report dated Dec. 22, 2021, in Application No. EP21183687.9.
Examination Report, dated Sep. 14, 2020, for European Patent Application No. 15864779.2, 3 Pages.
Extended European Search Report, dated May 22, 2018, for European Patent Application No. 15864779.2.
Final Office Action for U.S. Appl. No. 15/726,302, dated Dec. 30, 2020.
Final Office Action for U.S. Appl. No. 15/929,959, dated Apr. 29, 2021.
First Office Action, dated Dec. 15, 2020, for Canadian Patent Application No. 2,969,113.
First Office Action, dated Jan. 14, 2020, for Brazilian Patent Application No. BR112017011548-4, with English Translation.
First Office Action, dated Jan. 14, 2020, for Brazilian Patent Application No. BR112017011768-1, with English Translation.
First Office Action, dated May 10, 2021, for Canadian Patent Application No. 2,969,117.
Flexible Graphite Foil as viewed at https://hpmsgraphite.com/graphitefoil using the Wayback machine (Year: 2004).
Flexible Graphite Foil as viewed at https://hpmsgraphite.com/graphitefoil via the Wayback archive (Year: 2018).
Fu, Jie, "Fast Li+ ion conducting glass-ceramics in the system Li2O—Al2O3—GeO2—P2O5" Solid State Ionics 104 (1997), pp. 191-194.
Fu, Jie, "Fast Li+ Ion Conduction in Li2O—Al2O3—TiO2—SiO2—P2O5 Glass-Ceramics," Journal of the American Ceramics Society, vol. 80, No. 7, Jul. 1997, pp. 1-5.
Fu, Jie, "Superionic conductivity of glass-ceramics in the system Li2O—Al2O3—TiO3—P2O5", Solid State Ionics 96 (1997), pp. 195-200.
Geiss, M. "Sacrificial Interlayers for All-solid-state Batteries", Aug. 14, 2020, pp. 243.
George, S.M., "Atomic layer deposition: an overview", Chemical reviews, (Jan. 13, 2010), 110(1):111-31.
Hayashi, A. et al., "Preparation of $Li_2S$—$P_2S_5$ Amorphous Solid Electrolytes by Mechanical Milling," Journal of American Ceramic Society, Feb. 28, 2001, vol. 84, No. 2, pp. 477-479.
Hayashi, Akitoshi et al., "Characterization of Li2S—P2S5 glass-ceramics as a solid electrolyte for lithium secondary batteries," Solid State Ionics 175 (2004) 683-686.
Hayashi, Akitoshi et al., "Formation of superionic crystals from mechanically milled Li2S—P2S5 glasses," Electrochemistry Communications 5 (2003) 111-114, Nov. 26, 2002.
Hayashi, Akitoshi et al., "Mechanochemical synthesis of amorphous solid electrolytes using SiS2 and various lithium compounds," Solid State Ionics 175 (2004) 637-640, Dec. 9, 2003.
Hayashi, Akitoshi et al., "Preparation and ionic conductivity of Li7P3S11-z glass-ceramic electrolytes," Journal of Non-Crystalline Solids 356 (2010) 2670-2673.

(56) References Cited

OTHER PUBLICATIONS

Hirota, Yukihiro and Osamu Mikami, "Energy Barrier Height Measurements of Chemically Vapour Deposited, P3N5 Films by Internal Photoinjection", Thin Solid Films, vol. 162, (Aug. 1988), pp. 41-47.
Hoffman, E. E., "Solubility of Nitrogen and Oxygen in Lithium and Methods of Lithium Purification," in Symposium on Newer Metals, ed. R. Jaffee (West Conshohocken, PA: ASTM International, 1960), 195-206. https://doi.org/10.1520/STP46339S.
HPMS HP Materials Solutions Inc., "Flexible Graphite Foil", The Wayback Machine, 2021, pp. 1-7.
Johnson, R.W., Hultqvist, A., Bent, S.F., "A brief review of atomic layer deposition: from fundamentals to applications", Materials today, (Jun. 1, 2014), 17(5):236-46.
Jones, Steven D. et al., "A thin-film solid-state microbattery," Journal of Power Sources, 43-44 (1993) 505-513.
JP Notice of Reasons for Rejection dated Oct. 5, 2021, in application No. JP20200181662 with English translation.
JP Office Action dated Jan. 4, 2023, in Application No. JP2020-181662 with English translation.
JP Office Action dated May 31, 2022, in Application No. JP2020-181662 with English translation.
Kanno, R. and M. Murayama, "Lithium ionic conductor thio-LISICON: the Li2 S GeS2 P 2 S 5 system", Journal of the electrochemical society, (Jun. 5, 2001), 148(7):A742.
Kato, A. et al., "High-Temperature Performance of All-Solid-State Lithium-Metal Batteries Having Li/Li₃PS₄ Interfaces Modified with Au Thin Films", Journal of The Electrochemical Society, 2018, vol. 165, No. 9, pp. A1950-A1954.
Kennedy, J.H., "Ionically conductive glasses based on SiS2," Materials Chemistry and Physics, 23 (1989) 29-50.
Kennedy, John H. et al., "Improved stability for the SiS2—P2S5—Li2S-Lil glass system," Solid State Ionics 28-30 (1998) 726-728.
Kennedy, John H. et al., "Ionically conductive sulfide-based lithium glasses," Journal of Non-Crystalline Solids 123 (1990) 328-338.
Kennedy, John H. et al., "Preparation and conductivity measurements of SiS2—Li2S glasses doped with LiBr and LiC1," Solid State Ionics 18 & 19 (1986) 368-371.
Kitaura, Hirokazu et al., "Fabrication of electrode-electrolyte interfaces in all-solid-state rechargeable lithium batteries by using a supercooled liquid state of the glassy electrolytes," J. Mater. Chem., 2011, 21, 118.
Kondo, S. et al., "New lithium ion conductors based on Li2S—SiS2 system," Solid State Ionics 53-56 (1992) 1183-1186.
KR Office Action dated Jun. 23, 2022 in Application No. KR10-2017-7018176 with English translation.
KR Office Action dated Nov. 23, 2023, in KR Application No. 10-2023-7010384 with English translation.
Lau, J., et al., "Sulfide Solid Electrolytes for Lithium Battery Applications," Advanced Energy Materials, 2018, vol. 8, pp. 1-24.
Levason, Bill and Andrew L. Hector (eds.), "Chemistry and Applications of Metal Nitrides," (Preface only), Coordinated Chemistry Reviews, vol. 257, Issues 13-14, (Jul. 2013), p. 1945.
Li, Xuemin et al., "Facile Synthesis of Lithium Sulfide Nanocrystals for Use in Advanced Rechargeable Batteries", ACS Appl. Mater. Interfaces, (Dec. 3, 2015), 7, 51, 28444-28451.
Maier-Komor, P., "Preparation of Phosphorus Targets Using the Compound Phosphorus Nitride", Nuclear Instruments and Methods in Physics Research Section A: Accelerators, Spectrometers, Detectors and Associated Equipment, vol. 257, Issue 1, (Jun. 1, 1987), pp. 1-3.
Malugani, J.P. et al., "Preparation and electrical properties of the 0,37 Li2S-0,18P2S5-0,45 Lil glass," Solid State Ionics 1 (1980) 519-523.
Mercier, René et al., "Superionic conduction in Li2S—P2S5-Lil—glasses," Solid State Ionics. (Oct. 1981) 5:663-666.
Mexican Office Action dated Oct. 20, 2022 issued in Application No. MX/a/2017/007265 with English translation.
Minami, Keiichi et al., "Electical and electrochemical properties of glass-ceramic electrolytes in the systems Li2S—P2S5—P2S3 and Li2S—P2S5—P2O5," Solid State Ionics 192 (2011) 122-125.
Minami, Keiichi et al., "Mechanochemical synthesis of Li2S—P2S5 glass electrolytes with lithium salts," Solid State Ionics 181 (2010) 1505-1509.
Minami, Keiichi et al., "Preparation and characterization of lithium ion conducting Li2S—P2S5—GeS2 glasses and glass-ceramics," Journal of Non-Crystalline Solids 356 (2010) 2666-2669.
Minami, Tsutomu et al., "Preparation and characterization of lithium ion-conducting oxysulfide glasses," Solid State Ionics 136-137 (2000) 1015-1023.
Mizuno, F., et al. "High lithium ion conducting glass-ceramics in the system Li2S—P2S5", Solid State Ionics, (Oct. 31, 2006), 177(26-32):2721-5.
Mizuno, Fuminori et al., "All Solid-state Lithium Secondary Batteries Using High Lithium Ion Conducting Li2S—P2S5 Glass-Ceramics", Chemistry Letters 2002, No. 12, The Chemical Society of Japan, (Dec. 5, 2002), 31(12):1244-1245 (with 2 cover pages).
Mizuno, Fuminori et al., "Lithium ion conducting solid electrolytes prepared from Li2S, elemental P and S," Solid State Ionics 177 (2006) 2753-2757.
Mizuno, Fuminori et al., "New, highly Ion-Conductive Crystals Precipitated from Li2S—P2S5 Glasses", Advanced Materials, (Apr. 4, 2005), 17(7):918-21.
Murayama, M., et al., "Material design of new lithium ionic conductor, thio-LISICON, in the Li2S—P2S5 system", Solid State Ionics, (May 31, 2004), 170(3-4):173-80.
Non-Final Office Action for U.S. Appl. No. 14/954,812, dated Aug. 1, 2018.
Non-Final Office Action for U.S. Appl. No. 14/954,816, dated Aug. 1, 2018.
Non-final Office Action for U.S. Appl. No. 15/726,302, dated Apr. 16, 2020.
Non-final Office Action for U.S. Appl. No. 15/726,302, dated Sep. 10, 2021.
Non-final Office Action for U.S. Appl. No. 16/161,720, dated Apr. 28, 2020.
Non-Final Office Action for U.S. Appl. No. 16/174,058, dated Sep. 17, 2021.
Non-final Office Action for U.S. Appl. No. 16/179,803, dated Apr. 28, 2020.
Non-final Office Actions for U.S. Appl. No. 15/380,989, dated Mar. 26, 2019.
Notice of Allowance, dated Mar. 10, 2020, for Chinese Patent Application No. 201580075233.0, with English Translation.
Notice of Allowance dated Oct. 1, 2021, in U.S. Appl. No. 16/781,713.
Notice of Allowance for U.S. Appl. No. 14/954,812, dated Oct. 30, 2018.
Notice of Allowance for U.S. Appl. No. 14/954,816, dated Oct. 15, 2018.
Notice of Allowance for U.S. Appl. No. 15/380,989, dated Dec. 6, 2019.
Notice of Allowance for U.S. Appl. No. 16/012,588, dated Dec. 3, 2019.
Notice of Allowance for U.S. Appl. No. 16/161,720, dated Aug. 6, 2020.
Notice of Allowance for U.S. Appl. No. 16/179,803, dated Aug. 11, 2020.
Notice of Allowance for U.S. Appl. No. 16/341,872, dated Aug. 21, 2020.
Notice of Allowance for U.S. Appl. No. 16/341,874, dated Sep. 3, 2020.
Notice of Allowance for U.S. Appl. No. 16/663,177, dated Sep. 3, 2020.
Notice of Allowance for U.S. Appl. No. 15/929,959, dated Aug. 4, 2021.
Notice of Allowance for U.S. Appl. No. 15/929,959, dated Jul. 12, 2021.
Notice of Intention to Grant, dated Jan. 26, 2021, for European Patent Application No. 15864779.2, 7 Pages.
Notice of Reasons for Rejection, dated Jan. 14, 2020, for Japanese Patent Application No. 2017-529785, with machine translation.

(56) References Cited

OTHER PUBLICATIONS

Notice of Reasons for Rejection, dated May 24, 2019, for Japanese Patent Application No. 2017-529785, with machine translation.
Ohtomo, Takamasa et al., "All-solid-state lithium secondary batteries using the 75Li2S•25P2S5glass and the 70Li2S•30P2S5 glass-ceramic as solid electrolytes," Journal of Power Sources 233 (2013) 231-235.
Ohtomo, Takamasa et al., "Electrical and electrochemical properties of Li2S—P2S5—P2—O5 glass-ceramic electrolytes," Journal of Power Sources 146 (2005) 715-718.
Ohtomo, Takamasa et al., "Mechanochemical synthesis of lithium ion conducting glasses and glass-ceramics in the system Li2S—P—S," Solid State Ionics 176 (2005) 2349-2353.
Panasonic Industry "PGS" Graphite Sheets as viewed at 2021.
Park., 2013.—(machine translation), 13 pages.
Pradel, A., et al., "Lithium Chalcogenide Conductive glasses," Materials Chemistry and Physics, 1989, vol. 23, pp. 121-142.
Pradel, Annie et al., "Electrical properties of lithium conductive silicon sulfide glasses prepared by twin roller quenching," Solid State Ionics 18 & 19 (1986) 351-355.
Restriction Requirement for U.S. Appl. No. 15/380,989, dated Jul. 5, 2018.
Restriction Requirement for U.S. Appl. No. 15/726,302, dated May 6, 2019.
Restriction Requirement for U.S. Appl. No. 15/726,302, dated Nov. 19, 2019.
Restriction Requirement for U.S. Appl. No. 16/174,058, dated Apr. 16, 2020.
Rudolph, B. et al., "Cyclic voltammetry studies of the lithiumthioborate glass-indium interface," Electrochimica Acta, vol. 34, No. 11, pp. 1519-1521, 1989.
Sahami, Saeed et al., "Preparation and conductivity measurements of SiS2—Li2S—LiBr lithium ion conductive glasses," Journal of the Electrochemical Society, Apr. 1985, pp. 985-986.
Sakuda, Atsushi et al., "Sulfide solid electrolyte with favorable mechanical property for all-solid-state lithium battery," Scientific Reports 3:2261, Jul. 23, 2013.
Sandfire Scientific., "Quartz Ampoules Coated with Layer of Pyrolyzed Carbon," 2015, pp. 1-2. https://sandfire.com/quartz-ampoules-coated-with-layer-of-pyrolyzed-carbon/.
Second Office Action, dated Nov. 15, 2019, for Chinese Patent Application No. 201580075233.0, with English Translation.
Senevirathne, K. et al., "A New Crystalline LiPON Electrolyte: Synthesis, Properties, and Electronic Structure", Solid State Ionics, Feb. 21, 2013, vol. 233, pp. 95-101.
Svensson PH, Kloo L. Synthesis, structure, and bonding in polyiodide and metal iodide-iodine systems. Chemical Reviews. (Mar. 22, 2003), 103(5):1649-84.
Tatsumisago, M., et al., "Superionic conduction in rapidly quenched Li2S—SiS2—Li3PO4 glasses", Journal of the Ceramic Society of Japan, (Nov. 1, 1993), 101(1179):1315-7.
Tatsumisago, Masahiro et al., "Preparation and structure of lithium-ion-conducting mixed-anion glasses in the system LiBO2—LiBS2," J. Am. Ceram. Soc., 71 [9] 766-69 (1988).
Tatsumisago, Masahiro et al., "Recent development of sulfide solid electrolytes and interfacial modification for all-solid-state rechargeable lithium batteries," Journal of Asian Ceramic Societies 1 (2013) 17-25.
Tatsumisago, Masahiro, "Glassy materials based on Li2S for all-solid-state lithium secondary batteries," Solid State Ionics 175 (2004) 13-18.
Thangadurai, V. et al., "Novel fast lithium ion conduction in garnet-type $Li_5La_3M_2O_{12}$ (M=Nb, Ta)", Journal of the American Ceramic Society, Mar. 2003, vol. 86, No. 3, pp. 437-440.
Trevey, James et al., "Glass-ceramic Li2S—P2S5 electrolytes prepared by a single step ball billing process and their appliction for all-solid-state lithium-ion batteries," Electrochemistry Communications 11 (2009) 1830-1833.
U.S. Restriction Requirement dated Aug. 31, 2022 in U.S. Appl. No. 16/949,026.
U.S. Corrected Notice of Allowance dated Jun. 13, 2022, in U.S. Appl. No. 16/948,863.
U.S. Corrected Notice of Allowance dated May 16, 2024 in U.S. Appl. No. 17/303,707.
U.S. Corrected Notice of Allowance dated Sep. 20, 2023, in U.S. Appl. No. 18/175,374.
U.S. Final Office Action dated Jan. 16, 2024 in U.S. Appl. No. 17/243,429.
U.S. Final Office Action dated Mar. 6, 2023 in U.S. Appl. No. 16/948,835.
U.S. Final office Action dated Oct. 6, 2023 in U.S. Appl. No. 16/556,736.
U.S. Final Office Action dated Oct. 27, 2023 in U.S. Appl. No. 16/949,026.
U.S. Non Final Office Action dated Feb. 2, 2023 in U.S. Appl. No. 16/949,026.
U.S. Non Final Office Action dated Mar. 31, 2023 for U.S. Appl. No. 16/556,736.
U.S. Non-Final office Action dated Oct. 27, 2022 in U.S. Appl. No. 16/948,835.
U.S. Non-Final Office Action dated Apr. 11, 2023 in U.S. Appl. No. 17/303,707.
U.S. Non-Final Office Action dated Aug. 18, 2023, in U.S. Appl. No. 17/303,706.
U.S. Non-Final Office Action dated Dec. 4, 2023 in U.S. Appl. No. 17/302,027.
U.S. Non-Final Office Action dated Dec. 7, 2023 in U.S. Appl. No. 17/303,708.
U.S. Non-Final Office Action dated Dec. 23, 2022 in U.S. Appl. No. 16/784,162.
U.S. Non-Final Office Action dated Jan. 5, 2024 in U.S. Appl. No. 17/453,033.
U.S. Non-Final Office Action dated Jun. 7, 2023, in U.S. Appl. No. 17/243,429.
U.S. Non-Final Office Action dated Mar. 14, 2024 in U.S. Appl. No. 17/301,453.
U.S. Non-Final Office Action dated Nov. 18, 2022, in U.S. Appl. No. 16/948,836.
U.S. Notice of Allowance dated May 12, 2022, in U.S. Appl. No. 16/948,863.
U.S. Notice of Allowance dated Apr. 15, 2024 in U.S. Appl. No. 17/303,706.
U.S. Notice of allowance dated Dec. 9, 2022 in U.S. Appl. No. 17/248,225.
U.S. Notice of Allowance dated Feb. 15, 2024 in U.S. Appl. No. 16/721,787.
U.S. Notice of Allowance dated Jan. 9, 2023 in U.S. Appl. No. 16/948,836.
U.S. Notice of Allowance dated Jan. 19, 2023 in U.S. Appl. No. 16/948,836.
U.S. Notice of Allowance dated Jan. 30, 2024 in U.S. Appl. No. 16/721,787.
U.S. Notice of Allowance dated Jun. 6, 2024 in U.S. Appl. No. 17/303,706.
U.S. Notice of Allowance dated Jun. 20, 2023 in U.S. Appl. No. 16/509,385.
U.S. Notice of Allowance dated Mar. 15, 2023 in U.S. Appl. No. 16/948,835.
U.S. Notice of Allowance dated Mar. 20, 2023 in U.S. Appl. No. 17/817,494.
U.S. Notice of Allowance dated Mar. 27, 2024 in U.S. Appl. No. 17/302,491.
U.S. Notice of Allowance dated May 8, 2024 in U.S. Appl. No. 17/303,707.
U.S. Notice of Allowance dated May 8, 2024 in U.S. Appl. No. 17/303,708.
U.S. Notice of Allowance dated Oct. 20, 2021, in U.S. Appl. No. 16/781,713.
U.S. Notice of Allowance dated Sep. 12, 2023 in U.S. Appl. No. 18/175,374.
U.S. Appl. No. 16/948,864, inventors Visco et al., filed on Oct. 2, 2020.

(56) References Cited

OTHER PUBLICATIONS

U.S. Appl. No. 17/934,470, inventors Visco et al., filed on Sep. 22, 2022.
U.S. Appl. No. 18/048,400, inventors Visco et al., filed on Oct. 20, 2022.
U.S. Appl. No. 18/149,524, inventors Visco et al., filed on Jan. 3, 2023.
U.S. Appl. No. 18/175,374, inventors Visco et al., filed on Feb. 27, 2023.
U.S. Appl. No. 18/529,777, inventors Visco S J, et al., filed on Dec. 5, 2023.
U.S. Appl. No. 18/590,753, inventor Visco S, filed on Feb. 28, 2024.
U.S. Appl. No. 18/645,270, inventors Visco S.J, et al., filed on Apr. 24, 2024.
U.S. Appl. No. 18/671,767, inventor Visco S, filed on May 22, 2024.
U.S. Appl. No. 18/671,779, inventor Visco S, filed on May 22, 2024.
U.S. Restriction requirement dated Apr. 3, 2023 in U.S. Appl. No. 17/303,706.
U.S. Restriction Requirement dated Dec. 23, 2022 in U.S. Appl. No. 16/556,736.
U.S. Restriction Requirement dated Jan. 18, 2023 in U.S. Appl. No. 17/303,707.
U.S. Restriction requirement dated May 18, 2023, in U.S. Appl. No. 16/721,787.
U.S. Restriction Requirement dated Nov. 3, 2022 in U.S. Appl. No. 16/509,385.
Visco, Steven J. et al., "Complex plane and 7Li NMR studies of arsenic sulfide-based lithium glasses," J. Electrochem. Soc.: Solid-State Science and Technology, Jul. 1985, pp. 1766-1770.
Visco, Steven J. et al., "Complex plane and 7Li NMR studies of highly conductive sulfide-based lithium glasses," Battery Testing, vol. 132, No. 4, pp. 751-753.
Wada, H., et al., "Preparation and ionic conductivity of new B2S3—Li2S-LiI glasses", Materials research bulletin, (Feb. 1, 1983), 18(2):189-93.
Wenzel, Sebastian et al., "Interphase formation and degradation of charge transfer kinetics between a lithium metal anode and highly crystalline Li7P3S11 solid electrolyte", Solid State Ionics, (Mar. 1, 2016), 286:24-33.
Wikipedia., "Sintering", The Free Encyclopedia, 2023, pp. 1-15.
WO patent application No. PCT/US2015/063231, International Search Report and Written Opinion mailed Mar. 11, 2016.
WO patent application No. PCT/US2015/063234, International Search Report and Written Opinion mailed Apr. 1, 2016.
WO patent application No. PCT/US2016/067338, International Preliminary Report on Patentability, dated mailed Jul. 5, 2018.
WO patent application No. PCT/US2016/067338, International Search Report and Written Opinion mailed May 19, 2017.
WO patent application No. PCT/US2018/039862, International Search Report and Written Opinion mailed Oct. 19, 2018.
WO patent application No. PCT/US2018/039862, Invitation to Pay Additional Fees and, where applicable, Protest Fee, dated Aug. 28, 2018.
WO patent application No. PCT/US2018/042476, Invitation to Pay Additional Fees and, where applicable, Protest Fee, dated Sep. 12, 2018.
Yang, M. et al., "Membranes in lithium ion batteries," Membranes, Jul. 4, 2012, vol. 2, pp. 367-383.
U.S. Corrected Notice of Allowance dated Jun. 26, 2024 in U.S. Appl. No. 17/302,491.
U.S. Corrected Notice of Allowance dated Oct. 28, 2024 in U.S. Appl. No. 18/191,615.
U.S. Final Office Action dated Jul. 29, 2024 in U.S. Appl. No. 17/453,033.
U.S. Non-Final Office Action dated Aug. 19, 2024 in U.S. Appl. No. 17/658,646.
U.S. Non-Final Office Action dated Nov. 14, 2024 in U.S. Appl. No. 17/658,639.
U.S. Non-Final Office Action dated Oct. 23, 2024 in U.S. Appl. No. 18/333,282.
U.S. Non-Final Office Action dated Oct. 31, 2024 in U.S. Appl. No. 17/649,550.
U.S. Notice of Allowance dated Oct. 17, 2024 in U.S. Appl. No. 18/191,615.
U.S. Appl. No. 18/778,101, inventors Visco S, et al., filed on Jul. 19, 2024.
U.S. Restriction requirement dated Nov. 18, 2024 in U.S. Appl. No. 17/648,120.
U.S. Restriction requirement dated Oct. 1, 2024 in U.S. Appl. No. 17/650,770.
U.S. Restriction requirement dated Oct. 24, 2024 in U.S. Appl. No. 17/249,864.
U.S. Restriction requirement dated Sep. 5, 2024 in U.S. Appl. No. 17/658,645.
U.S. Restriction requirement dated Sep. 29, 2024 in U.S. Appl. No. 17/934,470.

\* cited by examiner

GLASSY EMBEDDED SOLID-STATE ELECTRODE ASSEMBLIES, SOLID-STATE BATTERIES AND METHODS OF MAKING ELECTRODE ASSEMBLIES AND SOLID-STATE BATTERIES

STATEMENT OF GOVERNMENT SUPPORT

This invention was made with Government support under Award No.: DE-AR0000772 awarded by the Advanced Research Projects Agency-Energy (ARPA-E), U.S. Department of Energy. The Government has certain rights in this invention.

CROSS-REFERENCE TO RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

Field and Related Art

This disclosure relates to battery cells and components and fabrication techniques, and in particular to and for a glassy embedded battery electrode assembly having a composite material structure composed of interpenetrating material components including a porous electroactive network including a solid electroactive material, and a continuous glassy medium including a Li ion conducting sulfide glass. Solid state battery cells are generally based on a solid electrolyte sandwiched between two electrodes, often involving a material layup composed of discretely fabricated component layers in a stacked or wound construction. While battery technology has substantially advanced in recent years, there remains demand for enhanced power output, reduced charging time and/or improved cycle life.

SUMMARY

The present disclosure provides glassy embedded solid-state electrode assemblies that support ampere-hour capacity and solid-state electrode separation when incorporated in a solid-state battery cell of the present disclosure and methods for their fabrication. In accordance with embodiments of the present disclosure, the glassy embedded solid-state electrode assembly i) supports high areal ampere-hour capacity in the solid-state, ii) enables minimization of non-active material for high energy density performance, and iii) provides ionically conductive solid-state separation in a battery cell between the electrode assembly, serving as a first electrode (e.g., the positive electrode), and a second electrode (e.g., the negative electrode).

To achieve this performance and functionality, the glassy embedded electrode assembly structure of the present disclosure includes a composite material structure composed of first and second interpenetrating material components, wherein the first component is a porous solid electroactive network and the second component is a continuous Li ion conductive glassy sulfide medium that encapsulates the electroactive network on a first major surface to form a glassy cover region that extends into the depth of the network, thus forming a three-dimensional (3-D) solid-state interface that is sufficiently robust, stable, and Li ion transparent to enable the fabrication of high performing lithium solid-state battery cells.

In various embodiments, the glassy embedded solid-state electrode assembly is intended for use in a solid-state Li metal battery cell, and in certain embodiments thereof the glassy cover region is substantially devoid of crystalline particles (i.e., crystallites) that are not suitably conductive to Li ions (i.e., have Li ion conducting <$10^{-8}$ S/cm), and in some embodiments the glassy cover region is substantially devoid of any crystallites or crystalline particles.

The glassy embedded electrode assemblies of the present disclosure comprise a composite material structure with an interpenetrating material architecture of a Li ion conductive glassy sulfide medium that embeds and encapsulates a porous solid electroactive network. As its name suggests, the solid electroactive network (or more simply "electroactive network") is composed of solid electroactive material (e.g., cathode active material) that undergoes electrochemical oxidation and reduction during battery cell charge and discharge, respectively (and vice-versa when the electroactive material is anode active material). Generally, by non-limiting example, for a positive glassy embedded electrode assembly of the present disclosure, the solid cathode active material typically has a potential ≥2 V vs. Li/Li$^+$ and for a negative electrode assembly, the solid anode active material typically has a potential ≤1.5 V Li/Li$^+$.

In various embodiments the surface(s) of the electroactive material and/or that of the electroactive network is protected by a thin layer (e.g., a nanofilm) that mitigates, and preferably prevents, adverse reaction between the glassy medium and the electroactive material of the network. For example, the electroactive network, including its interior pore surfaces, may be coated with conformal protective layer(s) using sol-gel or chemical vapor deposition techniques (e.g., atomic layer deposition, ALD) prior to embedding the network with Li ion conducting sulfide glass. For example, the network surfaces may be coated with a lithium metal oxide protective nanofilm (e.g., LiNbO$_3$, Li$_4$Ti$_5$O$_{12}$, Li$_2$SiO$_3$, LiAlO$_2$, Li$_2$ZrO$_3$, LiTaO$_3$). The protective layer may be particularly useful for mitigating or preventing adverse reactions when a high temperature approach is used for glassy embedding the electroactive network, with process temperatures near or about the melting or liquidus temperature of the Li ion conducting sulfide glass. Preferably, the glassy embedded electrode assembly is fabricated in a manner that the solid-state interface is devoid of reaction products resulting from Li ion conducting sulfide glass chemically reacting (e.g., oxidized) in direct contact with electroactive material of the network. For example, sulfidation of the electroactive material is generally mitigated or prevented, as disclosed herein, by using low temperature glassy embedding processes combined with a protective layer. Thickness of the protective layer may be varied depending on its composition. In various embodiments the protective layer is a nanofilm less than 1 micron thick, and typically less than 200 nm thick, or less than 100 nm thick, or less than 50 nm thick, and is oftentimes referred to herein as a protective nanofilm (or more simply as nanofilm).

In accordance with the present disclosure, the two major interpenetrating material components of the glassy embedded electrode assembly are the Li ion conducting glassy sulfide glass medium and the porous electroactive network. It should be apparent to one of ordinary skill in the art that when referring to the electroactive network as porous, it is not meant to infer that it is porous as an interpenetrating component in the electrode assembly, but rather that the network is formed with pores that are subsequently filled, fully or partially, with glassy sulfide media. For instance, in various embodiments, when the network pores are completely filled, the glassy embedded solid-state electrode assembly is a substantially dense structure.

A variety of porous electroactive networks are contemplated for use herein. In various embodiments the electroactive network is a discrete porous solid body that is preformed prior to fabricating the electrode assembly, and therewith may be considered herein as an intermediate product in accordance with manufacturing methods for making an electrode assembly of the present disclosure. Generally, such a preformed and porous electroactive network is fabricated as an intermediate product in the absence of glassy sulfide media. In particular embodiments the porous and preformed electroactive network is a porous electroactive monolith (e.g., a freestanding sheet or membrane) or monolithic electroactive layer by which the term monolith or monolithic means a continuous mass of electroactive material in the absence of glassy sulfide media, as opposed to a porous layer or coating that is composed of discrete electroactive material particles held together by a binder material (e.g., an organic binder or an inorganic binder). In various embodiments the preformed and porous electroactive monolith is exemplified in the form of a partially sintered construct of electroactive material (e.g., cathode active material of the intercalating type) that may be formed by compacting cathode active material particles (into a compact or green tape) and heating the compact or green tape to remove any binders and to bring about densification or partial densification by sintering.

In other embodiments the preformed electroactive network is a discrete porous solid body that is not monolithic, but rather a composite material of discrete electroactive particles held together by a binder material that is thermally stable for its utility as a binder when heated to the glass transition temperature Tg of the glassy sulfide medium or slightly above, and preferably the binder stable at 200° C., 250° C., 300° C., 350° C. and even more preferably thermally stable when heated to 400° C. Examples of such a discrete porous solid body include slurry coatings of electroactive particles and a binder dispersed in a carrier solvent that may be fabricated as freestanding sheets or more commonly as a coating on a current collecting substrate.

In yet other embodiments the electroactive network is not a discrete preformed body but a contiguous assemblage of electroactive particles that materializes in combination with glassy sulfide media as a result of forming a composite construct therefrom. For example, such a composite construct may be formed by pressing and heating (e.g., via hot isostatic pressing) a mixture of electroactive material particles and Li ion conductive glassy sulfide media (e.g., particles) in a manner that forms the electroactive network and the continuous Li ion conductive glassy medium as interpenetrating components, and in some embodiments effectuates an encapsulating glassy cover region on a first major surface of the composite structure.

In various embodiments the glassy embedded electrode assembly structure of the present disclosure is substantially fully dense, and in other embodiments the structure is not fully dense and has a void microstructure defined in part by the shape of the empty pores and their tortuosity throughout the assembly structure. In a fully dense embodiment, the electrode assembly structure may be wholly inorganic, entirely devoid of organic material. For instance, a wholly inorganic and substantially fully dense glassy embedded electrode assembly structure. When not fully dense, liquid or gel electrolyte may be impregnated into the voids when making a battery cell (e.g., with a hybrid architecture), wherein liquid electrolyte contacts only one electrode (e.g., the positive electrode). In such embodiments, the present disclosure provides a sealed electrode assembly having a construction that prevents outward seepage of the liquid phase component. In a specific embodiment, the liquid phase electrolyte is retained inside a solid polymer phase as a gel electrolyte. In various embodiments the method for making the sealed electrode assembly includes impregnating the glassy embedded electrode assembly structure with a liquid phase comprising a liquid electrolyte and a light or thermally polymerizable monomer that is activated for polymerization after it has been impregnated into the pores of the electrode assembly structure.

Typically, the electrode assembly includes a current collecting layer adjacent to and in direct touching contacting with the electroactive network. The composition of the current collecting layer depends on the electroactive material (e.g., copper or aluminum for a negative or positive electrode structure, respectively). In various embodiments the current collecting layer is deposited as a thin film (e.g., of 1-5 μm thickness) onto the second major surface of the electrode assembly structure, opposing the glassy encapsulating first major surface.

In various embodiments the glassy embedded electrode assembly is monopolar and serves as a positive electrode in a battery cell, and therefore is sometimes referred to herein as a glassy embedded positive electrode assembly (or more simply as a positive electrode assembly). In other embodiments the glassy embedded electrode assembly is a monopolar negative electrode assembly and is incorporated a battery cell to serve as a negative electrode. In yet other embodiments the glassy embedded electrode assembly has a bipolar construction that provides both negative and positive electrode function, with significant benefit in terms of minimizing inactive material weights and volumes. By use of the term monopolar it is meant that the electrode has the same polarity on both sides of the current collector. Whereas a bipolar electrode has active material of different polarities on opposing current collector surfaces.

In another aspect the present disclosure provides battery cells, especially solid-state battery cells, that include a glassy embedded electrode assembly that serves as the positive or negative electrode in the cell, and the glassy cover region of the electrode assembly provides an effective solid-state Li ion conducting separator that prevents direct contact between the electroactive network (e.g., a monolith of cathode active material) and the other electrode in the cell (e.g., a negative electrode such as, or comprising, Li metal).

In yet other aspects the present disclosure provides methods, including methods for making a glassy embedded solid-state electrode assembly, and methods for making a fully solid-state electrode assembly and methods for making a sealed electrode assembly containing a liquid phase, and methods for making a battery cell, including methods for making a fully solid-state battery cell and methods for making a hybrid battery cell composed of a liquid or gel containing sealed electrode assembly.

In various embodiments the method for making a glassy embedded electrode assembly structure involves providing or making a preformed porous solid electroactive network and embedding the pores of the network with sulfide glass solid electrolyte in a manner that forms a continuous medium of Li ion conducting glass (i.e., a glassy sulfide medium). In some embodiments the embedding method includes a high temperature process that involves heating the glass to its melting temperature or liquidus temperature and allowing or causing the molten glass to flow into the pores of the network as a hot molten/fluid (e.g., taking advantage of capillary forces), followed by cooling and solidifying the hot glass once it has been fully accommodated inside the pores. In various embodiments a low temperature embedding method is preferred and disclosed herein. In particular, the low temperature approach involves impregnating Li ion conducting sulfide glass particles into pores of the electroactive network, to form what is termed herein a "glassy electroactive prepreg." In various embodiments the prepreg is formed at or about room temperature, or no greater than 100° C., or no greater than 60° C., or no greater than 40° C. Once impregnated, the prepreg" is heated to a temperature at which the Li ion conducting sulfide glass particles viscously sinter together and preferably wet the network pores to form a continuous glassy medium interpenetrating with the electroactive network. Preferably the viscous sintering temperature is at or only slightly greater than Tg and below Tc (glass crystallization temperature) of the Li ion conducting glass. For example, the viscous sintering step takes place at a temperature that is above Tg and below Tc by at least 20° C., or below Tc by at least 30° C. or by at least 40° C. or by at least 50° C.; or below Tc and no more than 20° C. above Tg, or no more than 40° C. above Tg or no more than 60° C. above Tg, or below Tc and no more than 80° C. above Tg.

BRIEF DESCRIPTION OF THE DRAWINGS

FIGS. 2A-B illustrate a double-sided glassy embedded electrode assembly, in accordance with various embodiments.

DETAILED DESCRIPTION

Figure 1A:
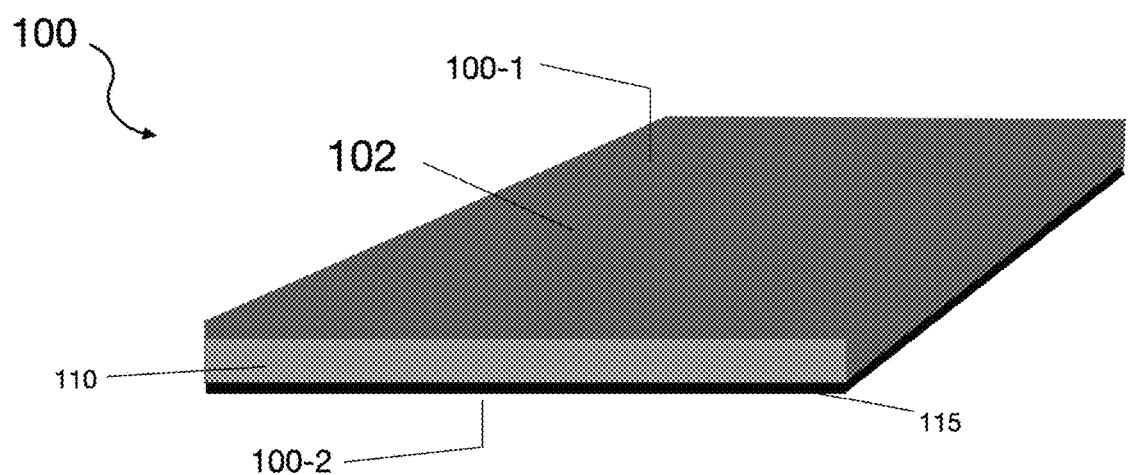
FIGS. 1A-B illustrate an electrode assembly structure that is monopolar and single-sided, having asymmetric opposing major surfaces with associated surface compositions that are materially different, in accordance with various embodiments.

Reference will now be made in detail to specific embodiments of the disclosure. Examples of the specific embodiments are illustrated in the accompanying drawings. While the disclosure will be described in conjunction with these specific embodiments, it will be understood that it is not intended to limit the disclosure to such specific embodiments. On the contrary, it is intended to cover alternatives, modifications, and equivalents as may be included within the spirit and scope of the disclosure as defined by the appended claims. In the following description, numerous specific details are set forth in order to provide a thorough understanding of the present disclosure. Embodiments of the present disclosure may be practiced without some or all of these specific details. In other instances, well known process operations have not been described in detail in order not to unnecessarily obscure the present disclosure.

When used in combination with "comprising," "a method comprising," "a device comprising" or similar language in this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this disclosure belongs.

Introduction

In one aspect, the present disclosure is directed to a glassy embedded solid-state electrode assembly structure that provides electrode, separator and electrolyte functionality in a battery cell in which it is incorporated. In various embodiments the electrode functionality of the assembly structure is monopolar. For instance, the glassy embedded solid-state electrode assembly structure is a positive electrode structure having a solid electroactive material network that is composed of cathode active material (CAM) and thus intended for use in a positive electrode assembly. In other embodiments the glassy embedded solid-state electrode assembly structure is a negative electrode structure having a solid electroactive material network that is composed of anode active material (AAM) and intended for use in a negative electrode assembly. In various embodiments, the glassy embedded electrode assembly structure has a single-sided architecture; for instance, a single-sided positive electrode assembly structure or a single-sided negative electrode assembly structure. In other embodiments the electrode structure is monopolar and double-sided. For instance, a double-sided positive electrode assembly structure or a double-sided negative electrode assembly structure. In various embodiments the double-sided electrode assembly structure is substantially symmetric and may be composed of a pair of opposing first and second single-sided structures. Asymmetric double-sided electrode assembly structures are also contemplated, including a bipolar double-sided glassy embedded solid-state electrode assembly structure composed of a first positive electrode assembly structure and a second negative electrode assembly structure.

FIGS. 1A-B and FIGS. 2A-B illustrate high level depictions of a single and double-sided solid-state glassy embedded electrode assembly in context prior to its incorporation in a battery cell, and in accordance with various embodiments of the present disclosure.

Figure 1B:
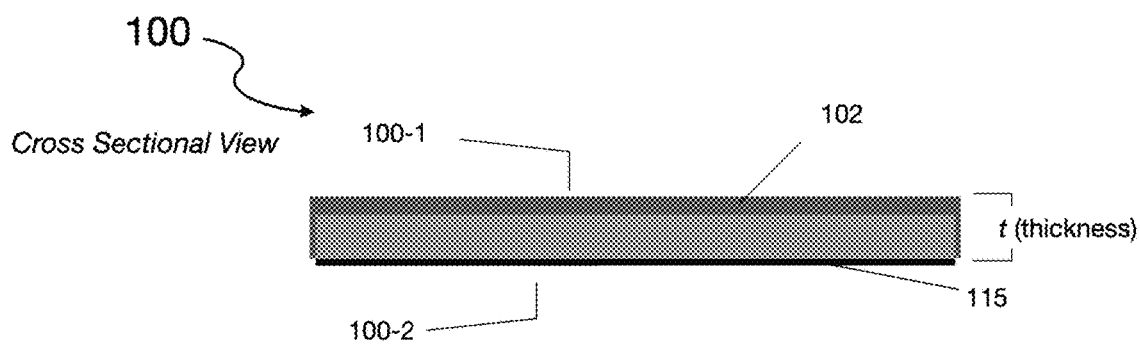
Figure 2B:
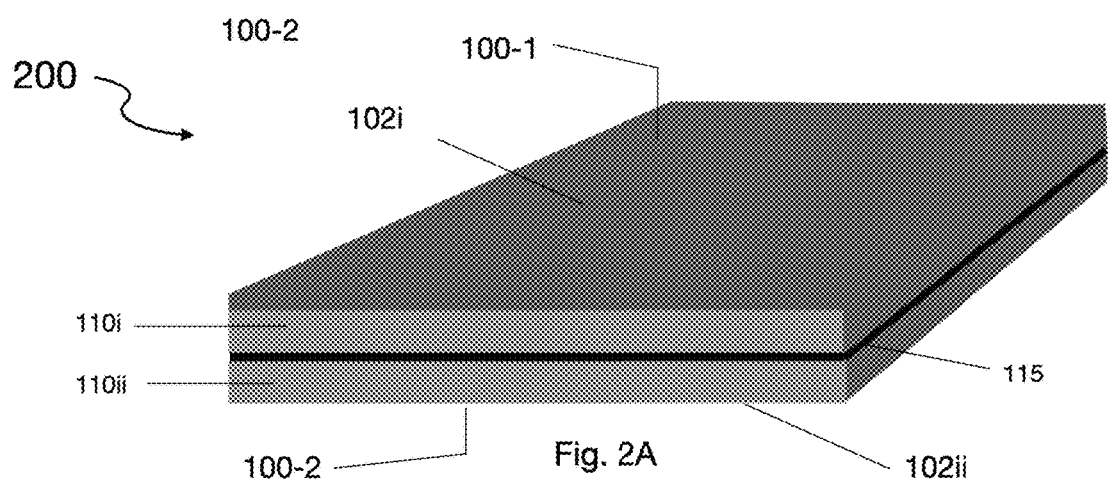
Figure 2B:
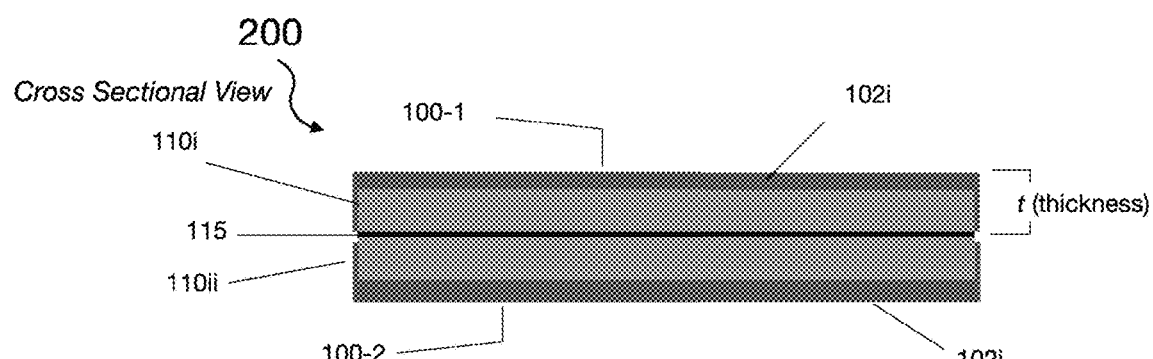

In FIGS. 1A-B, single sided electrode assembly structure 100 has first and second major opposing surfaces 100-1/100-2 and is composed of porous solid electroactive network 110 and inorganic glassy sulfide electrolyte medium 102. Network 110 is a body (e.g., a layer or sheet) composed of electroactive material and glassy medium 102 is a continuous medium of Li ion conducting sulfide glass. Glassy medium 102 encapsulates a first surface of the network and embeds into its depth (not shown) to form a continuous three-dimensional solid-state interface in direct contact with interior surfaces of the network. Network 110 is electroactive and provides ampere-hour capacity for the assembly while glassy medium 102 is ionically conductive and supports uniform Li ion migration throughout. In FIGS. 2A-B, double sided electrode assembly structure 200 is essentially a pair of single-sided structures stacked in a back-to-back fashion.

In various embodiments glassy embedded solid-state electrode assembly structures 100/200 may be incorporated in a battery cell as fully solid-state structures, and in embodiments thereof the structures may be wholly composed of inorganic materials. In other embodiments, the electrode assembly structure is fabricated for use as a hybrid construct that allows liquid electrolyte and/or a gel electrolyte to penetrate voids that are not filled by the glassy medium during battery cell assembly.

Structures 100/200 are generally layer-like, such as a flat sheet, having first and second major opposing surfaces 100-1/100-2 and a total thickness (t) that is significantly less than the apparent area of either the first or second major surface. Thickness is a tightly controlled parameter and depends in part on the desired aerial capacity (i.e., ampere-hour capacity per unit area) of the structure. Oftentimes thickness will be chosen as a tradeoff between battery rate capability (i.e., power density) and battery energy density (i.e., energy per unit weight or volume). Single sided glassy embedded electrode assembly structures generally have a thickness in the range of 20 mm to 1000 mm. In various embodiments the structure has a thickness in the range of about 20 mm to about 100 mm, or about 100 mm to about 150 mm, or about 150 mm to about 250 mm, or about 250 mm to about 550 mm, or about 550 mm to about 1100 mm. The typical thickness range of the double-sided electrode assembly is about double that of the single-sided assembly structures.

As illustrated in FIGS. 1A-B, electrode assembly structure 100 is monopolar and single-sided (e.g., a single-sided positive electrode assembly), having asymmetric opposing major surfaces with associated surface compositions that are materially different. For instance, first major surface 100-1 may have a homogenous chemical makeup that is wholly defined by inorganic glassy sulfide medium 102 and second major surface 100-2 is not glassy embedded or glassy encapsulated, and in various embodiments (as described herein below) may be a heterogenous mix of embedded glassy sulfide electrolyte medium and electroactive material of the network, or homogenous and wholly composed of the electroactive material. Second major surface 100-2 is typically defined by current collecting sublayer 115 (e.g., a thin metal layer, not shown).

In FIGS. 2A-B glassy embedded electrode assembly 200 is double-sided. In various embodiments, double-sided electrode assembly 200 is monopolar, as both sides of current collecting layer 115 have similar or same porous electroactive networks 110$i$/110$ii$ (e.g., both having the cathode active material). However, the disclosure is not limited as such, and in other embodiments a double-sided structure of the bipolar type is contemplated, wherein network 110$i$ is composed of cathode active material and network 110$ii$ is composed of anode active material.

The two major material components of the glassy embedded solid-state electrode assembly structure are the electroactive network and the inorganic glassy sulfide electrolyte medium that embeds into the pores of the network and encapsulates it on a major surface. General features and aspects of the two major interpenetrating components are described below and this is followed by a more detailed description of particular/exemplary embodiments with reference to the figures.

Glassy medium 102 is composed in whole, or in part, of inorganic sulfide glass that is highly conductive of Li ions and preferably has a low softening temperature such that by the application of moderate heat the glass can be caused to wet, flow and/or viscously sinter to itself and wet the electroactive network (e.g., by heating the glass within a temperature range between its glass transition temperature ($T_g$) and its crystallization temperature ($T_c$). The glassy sulfide electrolyte medium is inorganic, highly conductive of Li ions and composed, in whole or in part, of an inorganic sulfide glass having a Li ion conductivity that is preferably at least $10^{-5}$ S/cm and more preferably at least $10^{-4}$ S/cm. Moreover, glassy sulfide electrolyte medium 102 is itself highly conductive (at least $10^{-5}$ S/cm), and preferably has Li ion conductivity of at least the same order of magnitude as that of the inorganic sulfide glass composition(s) from which it is made (e.g., between $10^{-2}$ S/cm-$10^{-5}$ S/cm). In various embodiments, the glassy sulfide electrolyte medium is solely composed of the inorganic sulfide glass, which may be single phase or multi-phase. Glassy sulfide medium 102 is generally composed of one or more glass network formers (e.g., $SiS_2$, $B_2S_3$, $P_2S_5$) and one or more glass network modifiers (e.g., $Li_2S$, $Li_2O$) and in some embodiments a dopant may be used for benefit such as to enhance conductivity and/or chemical stability (e.g., LiCl, LiI, $Li_3PO_4$).

Inorganic sulfide glasses suitable for use herein for making glassy sulfide medium 102 are described in U.S. Pat. No. 10,164,289, hereby incorporated by reference for its description relating to structure, composition and fabrication of inorganic sulfide glasses. Glassy medium 102 may be wholly constituted of one or more glass phases, or it may include a dispersion of crystalline phases, preferably conductive crystalline phases. Such crystalline phases are generally sulfidic Li ion conductors with a composition, size and quantity that may be tailored to tune the coefficient of thermal expansion of the glassy medium and/or elastic modulus and/or mechanical strength. Further details regarding the glassy medium, including its chemical makeup, are provided below, as well as methods of incorporating/embedding the glass into a "preformed" electroactive network, in accordance with manufacturing methods of the present disclosure. As used herein for the sake of readability, the term "Li-sulfide glass" may be used when referring to a Li ion conducting sulfide glass.

As its name suggests, solid electroactive network 110 is composed in whole, or in part, of electroactive material. The type and composition of the electroactive material depends on whether the electrode assembly structure is intended to serve as a positive or negative electrode. When serving as a positive electrode, the electroactive material of the network is composed of cathode active material (CAM), and when serving as a negative electrode it is composed of anode active material (AAM). In other embodiments, a bipolar structure is contemplated with a first electroactive network that is composed of cathode active material on one side of a current collecting layer and a second electroactive network that is composed of anode active material on the other side.

In accordance with embodiments of this disclosure, the electroactive network is a porous solid, and the electroactive material of the network is an inorganic solid. In various embodiments the electroactive network is composed solely of electroactive solid inorganic material, and therefore devoid of organic material components such as organic binders which might otherwise be used to provide cohesion or adhesion to a current collector. For instance, in various embodiments electroactive network is a binder-less solid inorganic layer or sheet of one or more inorganic electroactive material phases.

In various embodiments the overall geometric shape and size of electrode assembly 100/200 is determined by that of its electroactive network 110. In various embodiments the electroactive network is a substantially flat layer having a regular well-defined planar shape and dimension, such as rectangular, oval or circular (e.g., rectangular). A rectangular electroactive network typically has a width of at least 1 cm and length of at least 1 cm. For instance, a width of about 1 cm-5 cm, or about 5 cm-10 cm, or about 10 cm-20 cm and a length to width ratio of about 1 (e.g., a 5 cm by 5 cm square), or about 1.5 (e.g., a 5 cm by 7 cm rectangle), or about 2 (e.g., a 10 cm by 20 cm rectangle), or about 2.5 (e.g., a 10 cm by 25 cm rectangle), or about 3 (e.g., a 10 cm by 30 cm rectangle). In various embodiments, the electroactive network is cut to size from a larger material sheet, which, in certain embodiments may be formed as a continuous or semi-continuous tape or coating. In other embodiments the electroactive network may be formed as a discrete unit that may be shaped and sized by trimming its edges.

In accordance with various embodiments of the present disclosure, electroactive network 110 is a porous preformed solid of electroactive material, and typically has a total pore volume less than 50%, and generally ranges from about 10% to 50%; for instance, from about 10% to 20%, or about 20 to 30% or about 30% to 40%, or about 40% to 50%. Void volumes of about 5 to 10% are also contemplated. Thickness of network 110 generally ranges from about 10 µm to 1000 µm; for instance, between 10 µm to 20 µm, or between 20 µm-50 µm, or between 50 µm-100 µm, or between 100 µm-200 µm or between 200 µm-500 µm, or between 500 µm-1000 µm.

In various embodiments solid electroactive network 110 is preferably of sufficient strength to be a freestanding layer, and more preferably readily handleable. In accordance with embodiments, the internal pore microstructure and thickness of the network may be tailored for a particular end use application of the electrode. For instance, in some embodiments the electrode assembly structure is intended for use in a high-power fully solid-state electrode capable of supporting a battery electrical current that corresponds to high area current densities (i.e., current per unit area of the electrode structure) in the range of about 5 to 10 mA/cm$^2$, or greater. In other embodiments the electrode assembly structure has a thickness and pore structure that is tailored for use in a high-energy fully solid-state electrode assembly that enables a battery cell of high energy density (e.g., greater than or about 500 Wh/l, or greater than or about 750 Wh/l or greater than or about 1000 Wh/l) and/or high specific energy (e.g., greater than or about 200 Wh/kg or greater than or about 300 Wh/kg or greater than or about 400 Wh/kg).

In various embodiments, glassy embedded electrode assembly 100/200 is a positive electrode assembly that serves as a positive electrode in a battery cell, and in such embodiments electroactive network 110 is composed of one or more cathode active materials.

In various embodiments, the cathode electroactive material is a compound of at least one metal and one or more of oxygen and sulfur and phosphorous (e.g., transition metal oxides, transition metal sulfides, and transition metal phosphates). In embodiments, the metal oxide or metal sulfide or metal phosphate active material is a Li ion intercalation material, as is understood in the battery art. In various embodiments, Li ion intercalation compounds (e.g., lithium metal oxides) are particularly well suited as the active material herein because they substantially retain their atomic structure after repeated charging and discharging cycles. Without limitation, particularly suitable transition metals for the metal oxide or metal sulfide or metal phosphate intercalation compounds are Co, Fe, Ni, Mn, Ti, Mo, V, and W. Particular examples include lithium nickel oxide (LNO), lithium nickel cobalt aluminum oxide (NCA), lithium cobalt oxide (LCO) lithium nickel cobalt manganese oxide (NCM), nickel cobalt aluminum manganese oxide (NCAM) and lithium iron phosphate (LFP). When making an electroactive network, the cathode active intercalation materials include those which may be fully or partially lithiated as well as those which are un-lithiated in their as-prepared state. In various embodiments the cathode active material may be of single compositional phase, or a preformed electroactive network may be fabricated from a plurality (two or more) of phases (e.g., a combination of metal oxide and metal sulfide or metal phosphate intercalation materials or two or more different metal oxide intercalation materials or two or more metal sulfide intercalation materials, or two or more transition metal phosphate intercalation materials, and combinations thereof). In various embodiments, electroactive network 110 is composed of a particular type (or phase) of cathode active material. In other embodiments, glassy embedded electrode assembly structure 100/200 may be used in a negative electrode assembly that serves as a negative electrode in a battery cell, and electroactive network 110 is composed of one or more anode electroactive materials. Without limitation, the following materials are suitable for use herein as anode electroactive materials including lithium intercalating and alloying materials such as carbons (e.g., graphite and synthetic carbon), silicon and lithium titanates and combinations thereof.

In various embodiments the electroactive material of the network and the Li-sulfide glass of the glassy medium is selected for their chemical and electrochemical compatibility with each other. In such instances, the glassy medium may be embedded into the network in direct touching contact with electroactive material. In various embodiments a protective thin layer covers the electroactive material to minimize or eliminate direct contact. For instance, prior to glassy embedding, the protective layer is applied to a surface of the electroactive material or over the electroactive network as a whole (including the internal pore surfaces). The protective thin layer enhances interfacial properties within the body of the structure without imparting an undue resistance to Li ion migration, and is typically of nanometer thickness (i.e., a nanofilm). For example, the nanofilm thickness may range from about 200 nm to 2 nm (e.g., about 100 nm, or about 50 nm or about 20 nm or about 10 nm or about 5 nm). In various embodiments the protective nanofilm enables the use of electroactive materials (e.g., high voltage CAMs) that are otherwise chemically incompatible in direct contact with the glassy medium. As described in more detail below, the protective nanofilm may be applied onto a preformed porous electroactive network in a manner that coats exterior and interior surfaces of the porous network. Details regarding the chemical makeup and methods for applying the nanofilm onto the surface of the electroactive material or preformed electroactive network are also described below.

A glassy embedded electrode assembly of the present disclosure is generally a composite material assembly of first and second interpenetrating component structures having different material makeups and functionality: a first structure that is a porous solid electroactive network (generally identified in the figures by numeral X10, where X is the Figure number) and a second structure that is a continuous Li ion conductive inorganic glassy sulfide medium (generally identified in the figures by numeral X02), which encapsulates the electroactive network on a first major surface and extends into its depth to form a three-dimensional solid-state interface between itself (the glassy medium) and the electroactive network. In various embodiments the glassy embedded electrode assemblies of the present disclosure may be differentiated by the material makeup and structure of the electroactive network.

Porous solid electroactive network 110 may take several forms. In various embodiments solid electroactive network 110 is a porous body that is preformed prior to it being glassy embedded (i.e., a preformed network). When preformed, the solid electroactive network is generally formed in the absence of glassy sulfide medium, and thus, in various embodiments, the preformed network is devoid of sulfide glass and more generally devoid of any sulfidic Li ion conductor, glassy, crystalline, or otherwise. In other embodiments the solid-state electrode assembly structure is an in-situ formed composite construct, and the solid electroactive network is not a preformed body. In-situ formed composites are generally fabricated by combining electroactive material particles and glassy sulfide media particles to effectuate an in-situ formed interpenetrating system of a solid electroactive network embedded by a glassy sulfide medium. The term in-situ is used herein as it indicates that the solid electroactive network (and the glassy medium) is formed as a result of the assembly fabrication.

In various embodiments the electroactive network is preformed prior to fabrication of the electrode assembly, and, in particular embodiments, preformed in the absence of organic material or glassy sulfide media, and generally binder-free. For instance, in various embodiments the preformed solid electroactive network is a porous monolith composed of electroactive material in the form of a continuous and coherent porous electroactive body. For example, in accordance with the present disclosure a preformed electroactive network is fabricated (e.g., as a monolith) prior to impregnating it with glassy sulfide media. Generally, the porous electroactive monolith is devoid, in its preformed state, of solid inorganic glassy sulfide electrolyte medium. For instance, a porous electroactive monolith may be fabricated by one or more of the following techniques, including partial sintering of one or more electroactive materials to form a porous electroactive monolithic sheet or layer or membrane, or by sintering electroactive material to full or partial densification followed by engineering anisotropic pores (e.g., substantially vertical) into the monolith to form the desired electroactive network structure, or reactively sintering electroactive precursor materials into a porous electroactive monolith (e.g., a porous sheet or porous membrane). By partial sintering it is meant sintering until incomplete densification (e.g., at a low or insufficient sintering temperatures).

In other embodiments the preformed solid electroactive network is not monolithic but rather a composite composed of a contiguous arrangement of discrete electroactive material particles conjoined together generally by means of a binder material (e.g., an organic binder). For example, the preformed electroactive network may be slurry coated/cast onto a current collecting substrate or extruded as a freestanding composite sheet of electroactive material particles and a binder or as a continuous self-supporting dry coated film.

In yet other embodiments solid electroactive network is not preformed prior to glassy embedding but rather materializes as an in-situ formed network when processing the assembly in combination with forming a glassy sulfide medium. For example, by hot isostatically pressing and heating a mixture of electroactive material particles and Li ion conductive glassy sulfide media in a manner to effectuate an interpenetrating composite.

Features, properties and methods for making the glassy embedded electrode assemblies of the present disclosure are highly dependent on the type of solid electroactive network (i.e., a preformed porous monolith, a preformed contiguous structure, or an in-situ composite formed by hot isostatically pressed, for example). Each of these embodiments are now described in more detail herein below.

With reference to FIGS. 3A-D there are illustrated in cross sectional depiction single-sided asymmetric glassy embedded solid-state electrode assembly structures 300A-D in accordance with various embodiments of the present disclosure. Assembly structures 300A-D are interpenetrating composite materials composed of first and second interpenetrating material components. First interpenetrating material component 310A-D is a solid electroactive network in the form of a porous preformed monolith of electroactive material having first and second opposing surfaces 311/312. Second interpenetrating material component 302 is a continuous inorganic glassy sulfide electrolyte medium, which, highly conductive of Li ions, embeds interior pore regions and encapsulates monolith first surface 311 to effectuate glassy cover region 307. When incorporated in a battery cell, glassy cover region 307 provides a material layer of positive separation between monolith 310A-D and an opposing electrode in the cell (not shown).

In various embodiments preformed monolith 310A-D is a freestanding or freestandable construct in the absence of a substrate (i.e., substrateless). In various embodiments the preformed monolith is a porous sintered sheet or membrane of electroactive material; for instance, a partially sintered sheet or membrane (e.g., monoliths 310A-C) or a fully or partially sintered construct with directional porosity that is engineered into the monolith post sintering (i.e., after the sintering step); for example, by using laser etching (e.g., see monolith 310D).

In various embodiments internal surfaces 309 and network major surface 311 are coated with a protective nanofilm (not shown) that is transparent to Li ions and provides an improved interface between the monolith and the embedded glassy sulfide medium. The nanofilm, as described in more detail herein below, is not electroactive (i.e., it does not undergo electrochemical reduction or oxidation during cell discharge/charge) or it is generally not considered an electroactive material for the reason that it is either not electroactive or, if it is fully or partially electroactive, it is not reversible or the mass of the nanofilm is such that it provides negligible or immeasurable reversible ampere-hour capacity, or no ampere-hour capacity.

Structures 300A-D are considered single-sided and asymmetric because their first and second major opposing surfaces 300-1/300-2 have different chemical makeups. Surface 300-1 is wholly defined by continuous glassy sulfide medium 302 and second major surface 300-2 is defined, at least in part, by a surface that includes electroactive material.

Thickness of the electrode assembly depends, in part, on the combined thickness of monolith 310A-D (which is measured between major surfaces 311/312) and glassy cover region 307 (which is measured from electrode assembly surface 300-1 to monolith surface 311). Thickness generally ranges from about 10 μm-1000 μm for electroactive monolith 310 and from about 1 μm to 50 mm for glassy region 307. A glassy cover region less than 1 μm is also contemplated (e.g., 0.1 to 1 μm). Glassy embedded electrode assembly structures incorporating a thin monolith (e.g., less than 100 μm or less than 50 μm) generally have a thin glassy cover region, and thicker monoliths may have a thicker glassy cover region. Non-limiting examples include a monolith having thickness in the range of 10-20 μm and a glassy cover region thickness in the range of 1 to 5 μm, or a monolith having thickness in the range of 20 to 50 μm and a glassy cover region thickness in the range of 5 to 10 μm, or a monolith having thickness in the range of 50 to 200 μm and a glassy cover region thickness in the range of 10 to 20 μm, or a monolith having thickness in the range of 200 to 500 μm and a glassy cover region thickness in the range of 10 to 30 μm, or a monolith having thickness in the range of 500 to 1000 μm and a glassy cover region thickness in the range of 10 to 50 μm.

Figure 4:
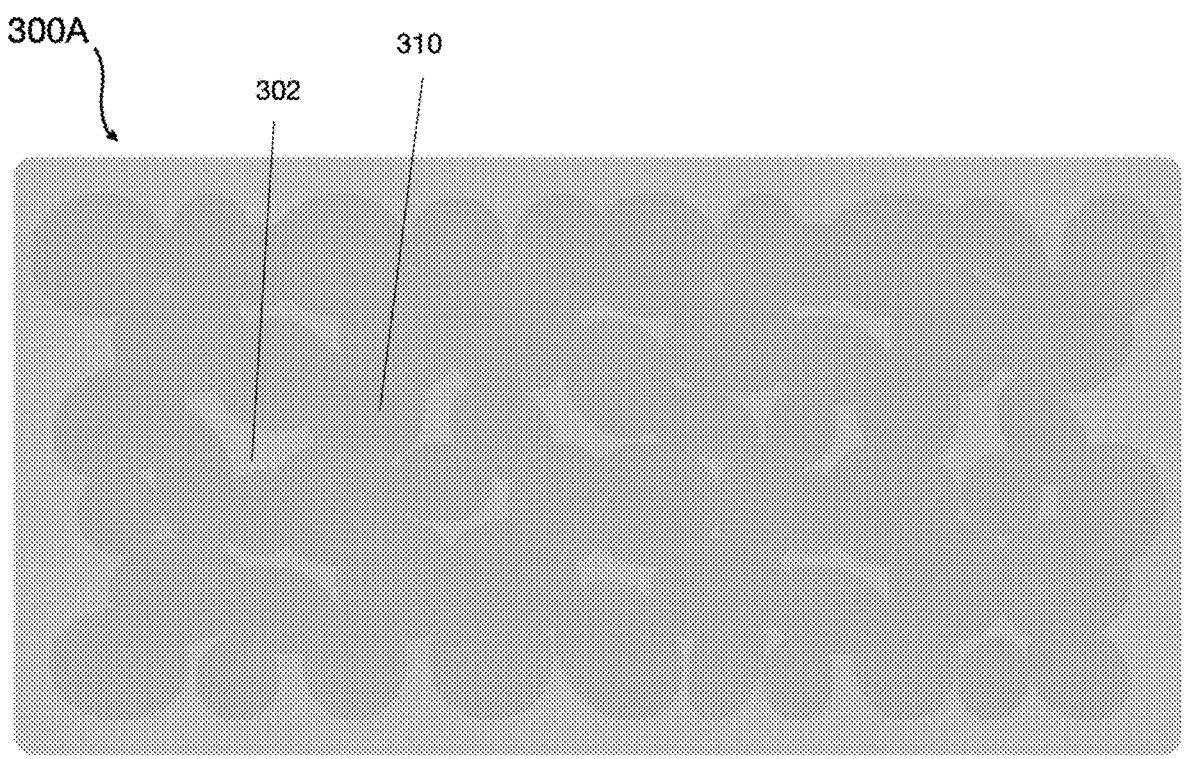
FIG. 4 illustrates a glassy embedded electrode assembly in top view from the perspective of looking directly at a major surface through a glassy cover region, revealing a boundary with electroactive network, in accordance with various embodiments.

In accordance with various embodiments, glassy medium 302 may be moderately or substantially transparent to visible and/or infrared light. In FIG. 4 glassy embedded electrode assembly 300A is shown in top view from the perspective of looking directly at major surface 300-1 and peering through glassy cover region 307, revealing the boundary with electroactive network 310. Transparency of glassy medium 302 allows for visual inspection of the interior portions of glassy cover region 307 and in some embodiments the interior three-dimensional interface between the monolith pore surfaces and the glassy medium may be inspected in a similar manner. By peering through surface 300-1 embedded features may be observed/detected such as by the human eye (e.g., when glassy medium 302 is visibly transparent) or via optical detection techniques (e.g., IR or visible microscopy), and thus employed for inspection and defect detection in accordance with quality control manufacturing aspects of the present disclosure.

Figure 3A:
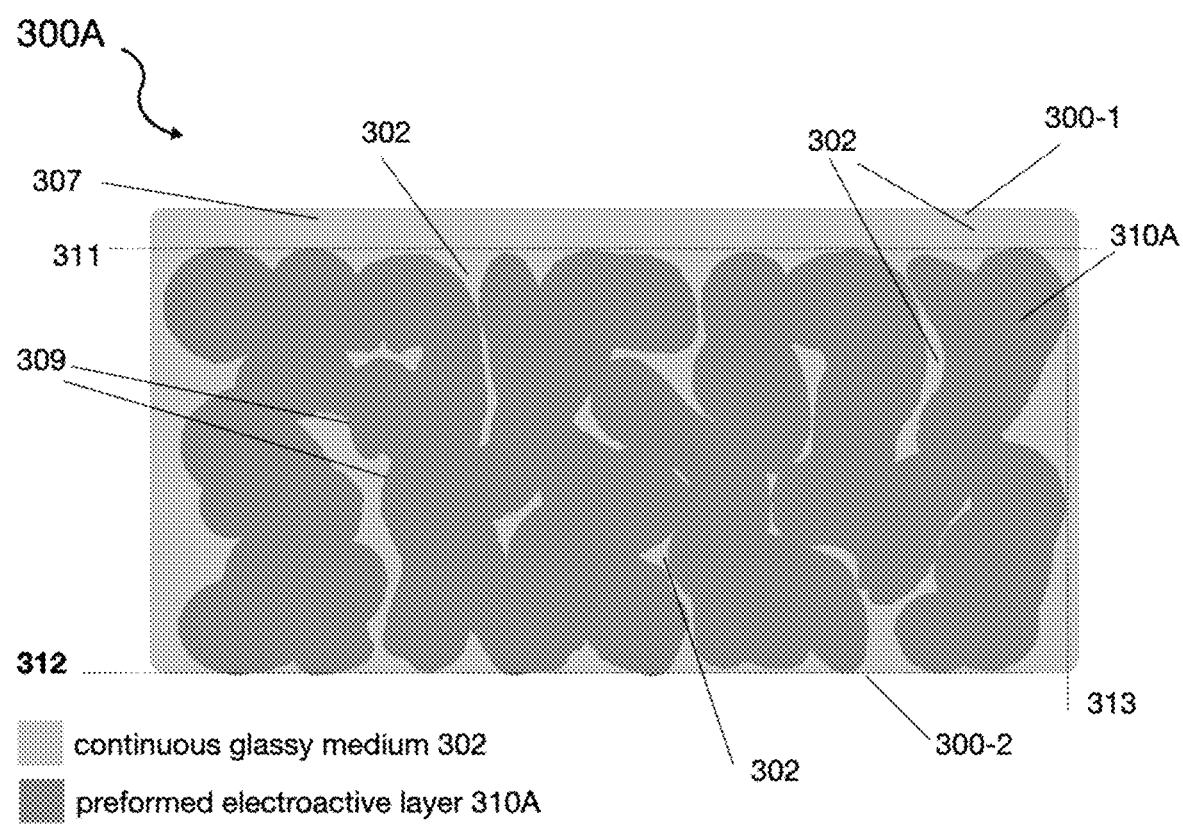
FIGS. 3A-D illustrate in cross sectional depiction single-sided asymmetric glassy embedded solid-state electrode assembly structures, in accordance with various embodiments of the present disclosure.

With specific reference to glassy embedded electrode assembly 300A shown in FIG. 3A, continuous glassy medium 302, in addition to providing glassy cover region 307, also blankets/encapsulates at least a portion of the edges about the periphery of the electroactive monolith; for instance, glassy medium 302 fully encapsulating peripheral edges 313.

Figure 3B:
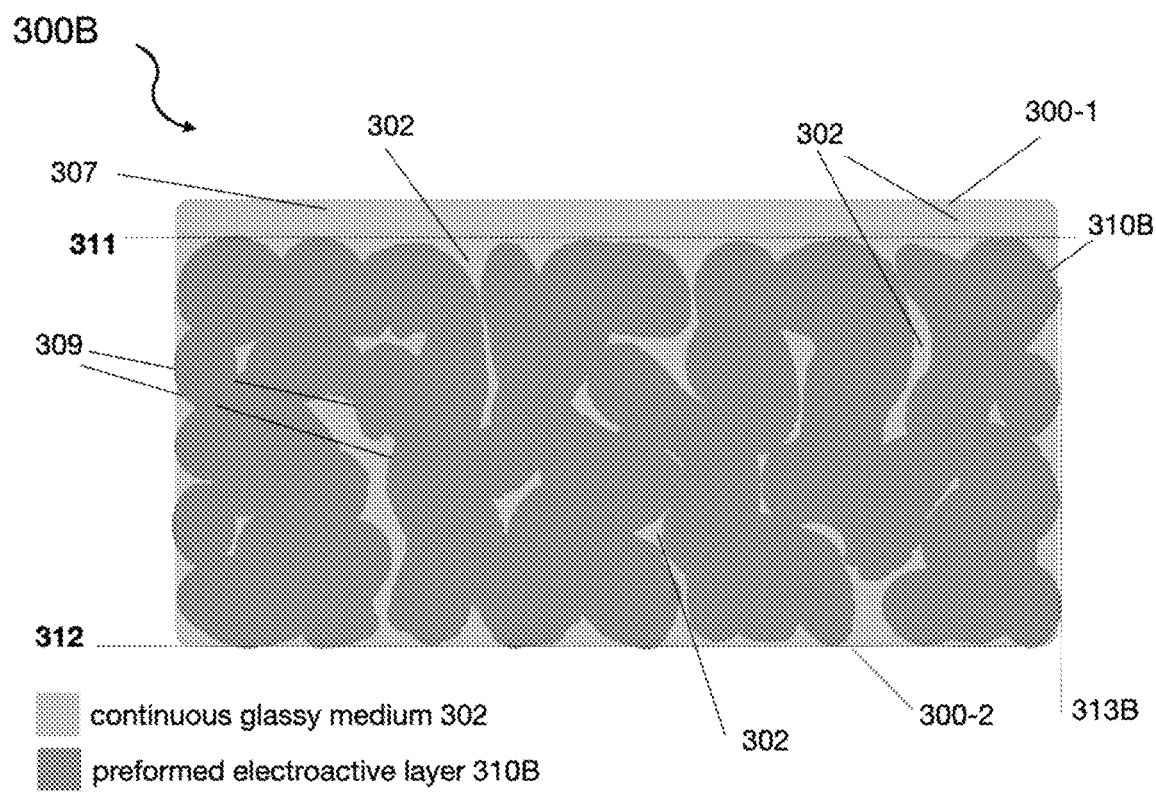
Figure 3C:
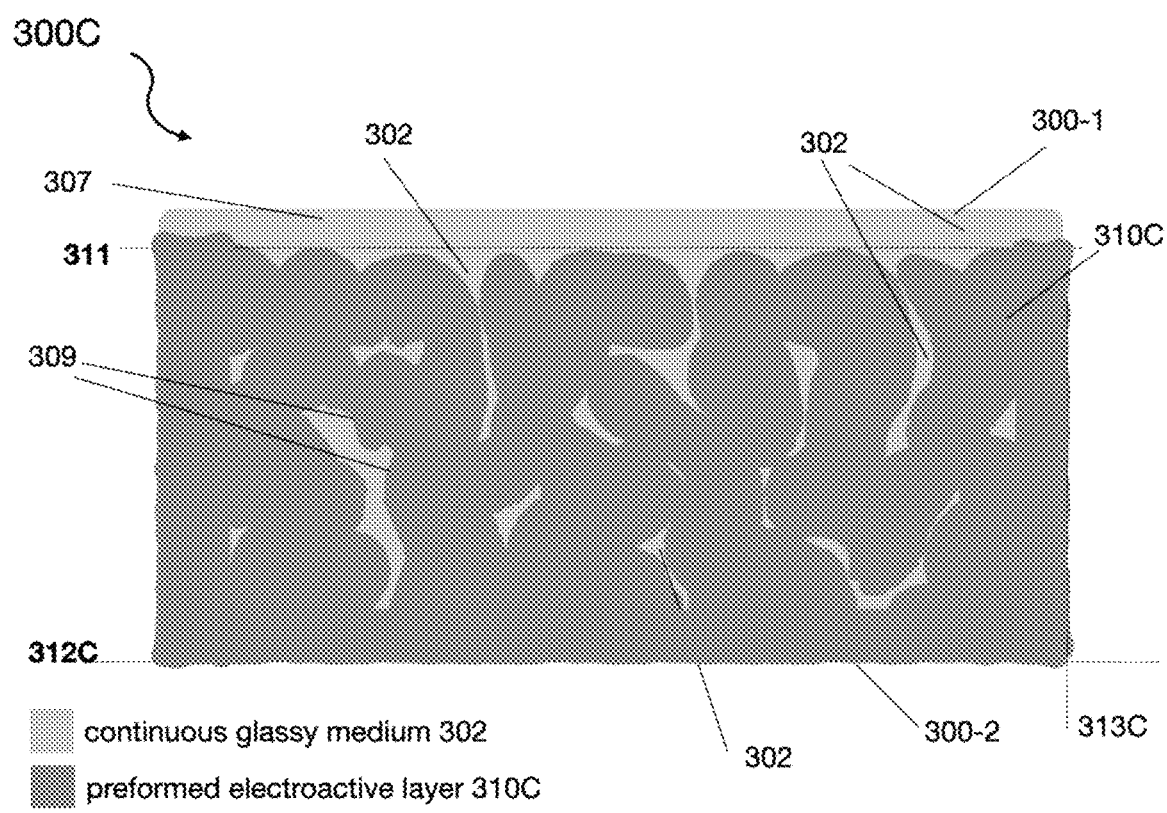

With specific reference to FIG. 3B electroactive material of monolith 310B is exposed at peripheral edge 313B, and so not edge encapsulated. Or, with reference to FIG. 3C, monolith 310C is fabricated to effectuate a substantially dense peripheral edge region 313C and a substantially dense backplane region 312C that defines surface 312. In other embodiments electrode assemblies are contemplated having a monolith with one or the other of a substantially dense backplane region or substantially dense peripheral edge region.

Figure 3D:
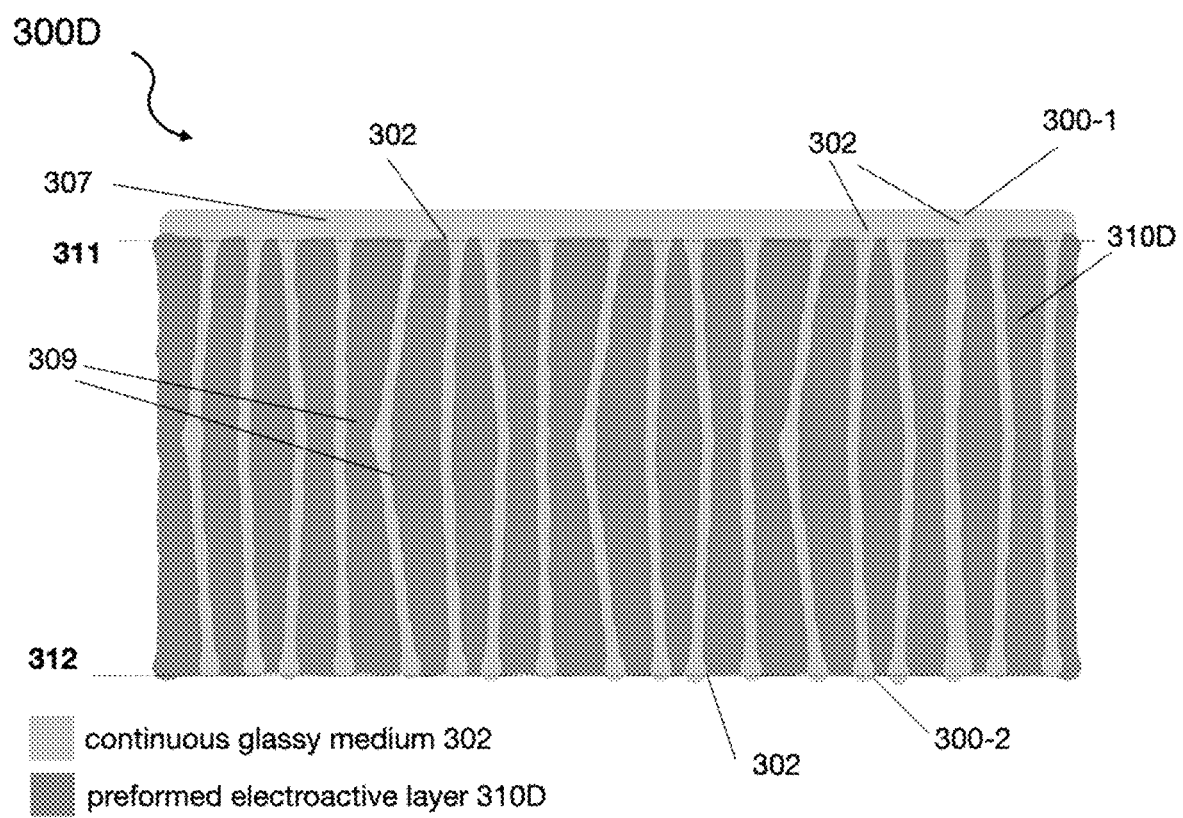

With specific reference to FIG. 3D, in various embodiments glassy embedded electrode assembly 300D has an electroactive network 310D that is a monolith with an engineered pore structure that is made by fabricating a monolithic body (e.g., by sintering partially or substantially to full density) and then engineering directional highly anisotropic pores using lithographic techniques and other processes such as laser structuring as described in more detail herein below.

Figure 5:
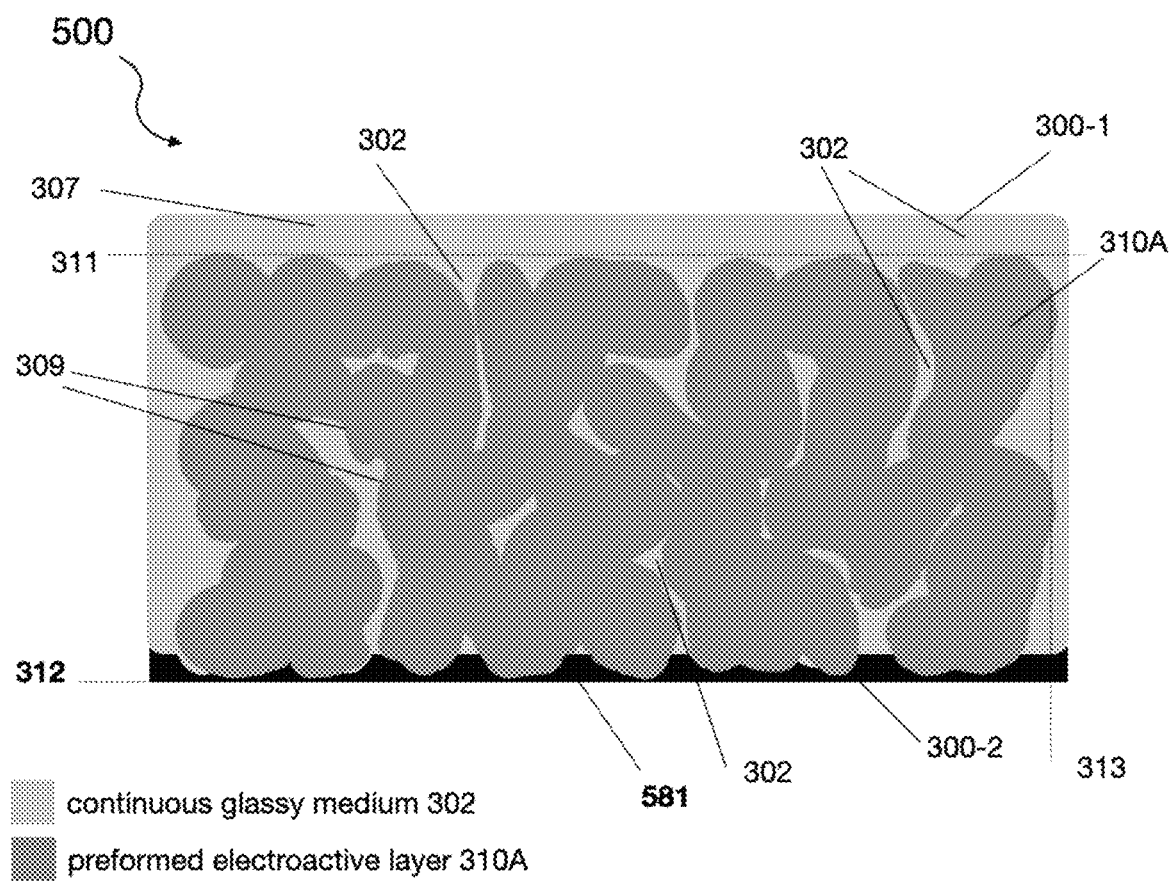
FIG. 5 illustrates a single-sided glassy embedded electrode assembly, in accordance with various embodiments.

Glassy embedded electrode assemblies of the present disclosure generally include a current collecting layer that may be placed or deposited onto the surface of electroactive network surface 312 (not shown in FIGS. 3A-D). By way of example, current collecting layer 581 is illustrated in FIG. 5 for a single-sided glassy embedded electrode assembly 500. The composition of the current collecting layer depends in part on its stability against the electroactive material. In various embodiments current collecting layer 581 is metallic. For instance, when glassy embedded electrode assembly 500 is a positive electrode assembly, current collecting layer 581 may be an aluminum layer or another stable metal layer (e.g., titanium) or a combination of metal layers that are suitable for use at the potential of the cathode active material. And likewise, for a negative electrode assembly, current collecting layer 581 may be a copper layer, or other suitable metal layer (e.g., nickel or titanium, or an aluminum layer for an anode active material above about 1.5V vs. Li/Li$^+$), or some combination thereof. Thickness of current collecting layer 581 depends, in part, on how it is applied onto or incorporated into the composite assembly structure. Physical vapor deposition techniques known in the art of metallization may be employed, including vacuum metallization (e.g., thermal/vacuum evaporation) and the like. When it is applied by physical vapor deposition techniques, thickness of current collecting layer 581, is generally about 5 μm or less (e.g., about 3 μm or about 2 μm or about 1 μm); for instance, between 0.1 to 1 μm thick. The deposition of a current collecting layer onto monolith surface 312 is advantageous in that it may more readily form an intimate contact with the electroactive material of the monolith, as opposed to merely placing a current collecting foil onto the surface.

Figure 6:
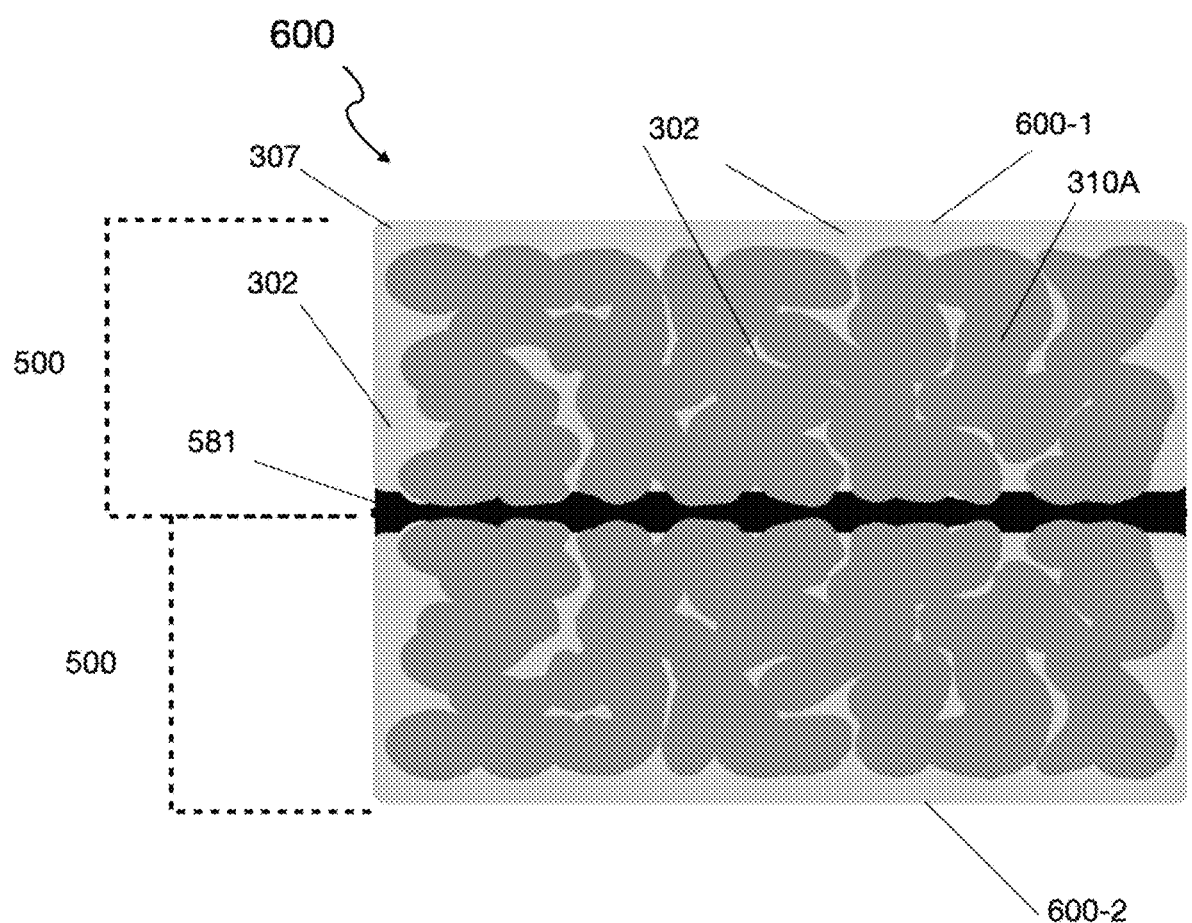
FIG. 6 illustrates a double-sided electrode assembly in cross-sectional depiction, in accordance with various embodiments of the present disclosure.

It should be readily apparent to one of skill in the art that the description above for an electrode assembly having a single-sided configuration is equally pertinent for assemblies having double-sided configurations. In various embodiments, a double-sided electrode assembly may be constructed by simply stacking a pair of identical single sided assemblies in a back-to-back fashion. In FIG. 6 double-sided electrode assembly 600 is illustrated in cross-sectional depiction, in accordance with various embodiments of the present disclosure. In various embodiments a simple stacking of first and second identical single-sided electrode assemblies may be employed for making double-sided assembly 600. In various embodiments a tie layer (not shown) may be used between opposing current collecting layers 581 to enhance mechanical or electrical contact, and/or a discrete current collecting layer or foil (e.g., a Cu or Al metal foil) may be disposed therebetween for collecting the current and providing an external connection such as a tab.

Figure 7:
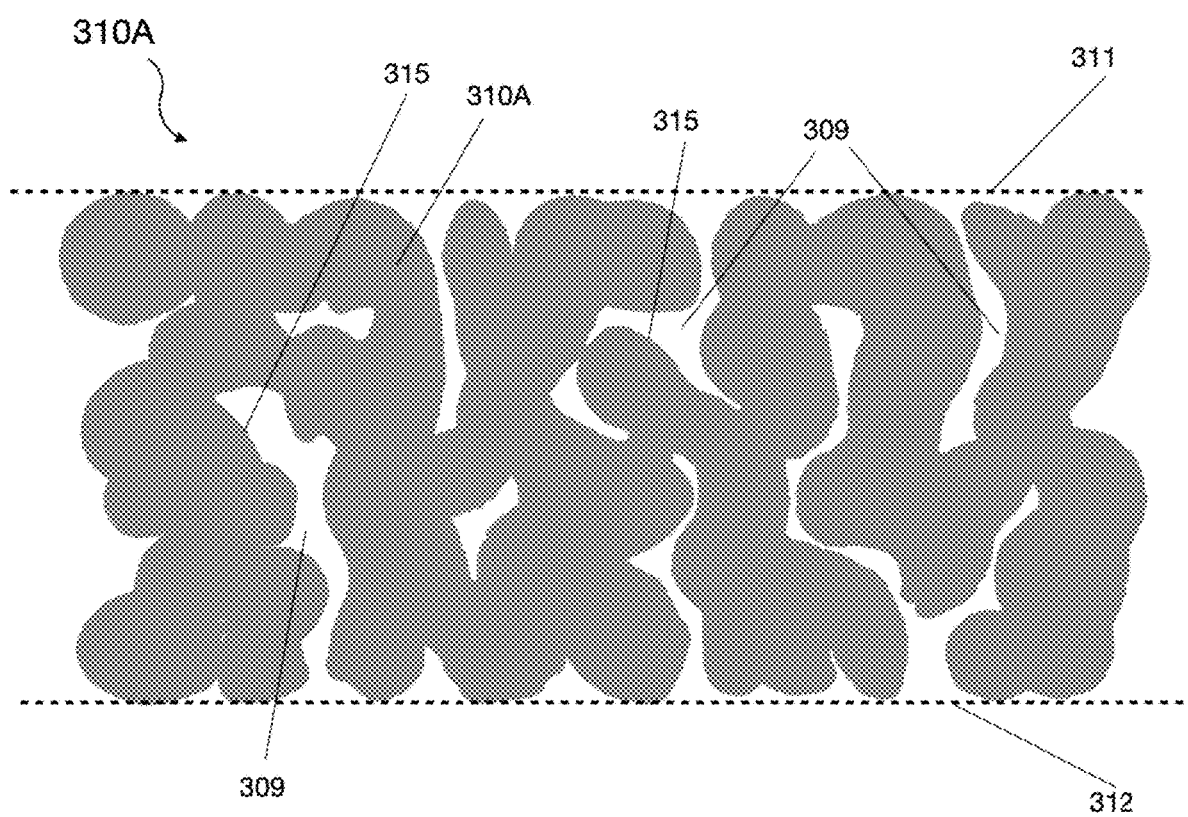
FIG. 7 illustrates a porous electroactive monolith, an intermediate component in its preformed state prior to being glassy embedded in accordance with various embodiments.

As described above with reference to FIGS. 3A-D, FIG. 5 and FIG. 6, in various embodiments electroactive network 310A-D is a preformed porous monolith of electroactive material that is fabricated as an intermediate component in the making of an electrode assembly, and in the absence of glassy sulfide media. For instance, as illustrated in FIG. 7 porous electroactive monolith 310A (as already described in the context of glassy embedded electrode assembly 300A, in FIG. 3A) is depicted in FIG. 7 as intermediate component in its preformed state prior to being glassy embedded. In particular, preformed monolith 310A is a coherent binder-less network entirely composed of continuous solid inorganic electroactive material with an interior network of pores 309 and pore surfaces 315 engineered to receive glassy sulfide media to form a continuous interpenetrating glassy sulfide medium within the depth of the network pore structure. In various embodiments, monolith 310A is "preformed" by partial sintering cathode active material, as described in more detail below.

In various embodiments the preformed monolith is a substantially flat membrane or sheet having regular planar dimensions (e.g., rectangularly shaped) and devoid of glassy sulfide media. Typically, the monolith has width of at least 1 cm and length of at least 1 cm. In embodiments a preformed monolith is formed as a continuous sheet that is cut to size; for instance, formed as a continuous sheet having a certain first dimension (i.e., width) and cut to its desired second dimension (i.e., length). In other embodiments the monolith is formed as a discrete unit having a discrete geometric shape and size (e.g., rectangular sheet of a certain width and length dimension). In embodiments, monolith 310A-D has width of about 1 to 5 cm or about 5-10 cm, or about 10-20 cm and a length to width ratio of about 1 (e.g., 5 by 5 cm), or about 1.5 (e.g., 5 by 7 cm), or about 2 (e.g., 10 by 20 cm), or about 2.5 (e.g., 10 by 15 cm).

The electroactive monolith is that component of the electrode assembly that provides ampere-hour capacity when incorporated in a battery cell. The areal capacity (mAh/cm$^2$) of the electrode assembly depends on the gravimetric capacity (mAh/g) of the electroactive material from which the monolith is composed and the mass of electroactive material per unit area, which, in turn, depends on thickness and pore volume of the monolith. Pore volume is typically less than 50%, and generally ranges from about 10% to 50%; for instance, from about 10% to 20%, or about 20 to 30% or about 30% to 40%, or about 40% to 50%. Pore volumes from about 5 to 10% are also contemplated. Monolith thickness generally ranges from about 10 mm to 1000 mm; for instance, between 10 mm to 20 mm, or between 20 mm-50 μm, or between 50 μm-100 mm, or between 100 mm-200 mm or between 200 mm-500 mm, or between 500 mm-1000 mm.

In various embodiments the preformed porous monolith is a based on a sintered body (e.g., a sheet or membrane formed by sintering a green body composed of the electroactive material and a binder) that is composed solely of solid inorganic material, and therefore devoid of organic material components such as organic binders which might otherwise be used to provide cohesion to a composite layer coating or otherwise an un-sintered product. For instance, the porous monolith may be a binder-less solid inorganic layer of one or more electroactive material phases.

In various embodiments, the preformed monolith is fabricated by sintering a green body of electroactive material generally in the form of a green sheet or tape, as is known in the ceramic sintering arts, and firing the green body to fuse the electroactive materials while burning off the binder in the process. Processes for making dense and porous sintered electroactive bodies for positive and negative electrodes for use in lithium-ion batteries are described in International Patent Publication No.: WO 2019/089926 entitled Sintered Electrode Cells for High Energy Density Batteries and Related Methods Thereof. Sintered electrode layers made by slurry casting a green tape layer and sintering the layer are described in U.S. Patent Application No. 2016/067455 entitled Slurry Formulation for the Formation of Layers for Solid Batteries. Tape cast and sintered layers are also described in WO 2019/089926, entitled Sintered Electrode Cells for High Energy Density Batteries and Related Methods Thereof.

In various embodiments, the sintering method involves creating a solid form such as a coating on a substrate (e.g., on a setter plate) or forming a green tape of the active material particles, such as by tape casting or slip casting or forming the green coating or green layer by spray drying or pressing or roll compaction or paste coating or casting into a mold, or formed by injection molding, or freeze casting (i.e., ice-templating) and then drying and firing the green construct at temperatures sufficient to induce sintering. In various embodiments, the pore structure and porosity are tailored by controlling the time, temperature and pressure at which the green tape or construct is sintered.

In various embodiments the preformed electroactive network is formed by partially sintering electroactive material particles, including both surface constrained and pressure-less sintering. In various embodiments, reactive sintering may be used to generate the porous construct. Phase segregation or a sacrificial phase may be used to generate pores. For instance, a slip-cast suspension of electroactive particles in a polymeric foam followed by burnout of the organic material and sintering. Or the porosity and pore structure of the electroactive network may be engineered by incorporating fugitive pore formers as is known in the art, of various shapes and sizes, including long rod-shaped fugitive particles that burn off during the sintering stage.

By controlling sintering parameters (e.g., time, temperature, atmosphere), electroactive powder morphologies (e.g., particle size, shape and particle size/shape distribution), green slurry composition including pore formers, the pore structure may be engineered to facilitate infiltration with glassy sulfide media while optimizing electrochemical performance and enhancing mechanical properties. In various embodiments preformed monolith has an expansive porous network with a pore structure that is engineered to minimize or eliminate dead end pores (sometimes called closed pores), which may be closed off to infiltration, while enhancing pores with through passages. For instance, through passageways may exist as straight through pores or pores that extend from the monolith first surface through to a peripheral edge.

In particular embodiments, a sintered monolith is prepared by initially forming a green tape having thickness ranging from about 20 µm to 1200 µm (e.g., between 20-50 µm or between 50-100 µm, or between 100-200 µm, or between 300-400 µm or between 400-500 µm or between 500-750 µm or between 750-1000 µm). For example, active material particles may be dispersed in a slurry that is cast into a green tape using slip casting or casting onto a carrier and spreading the slurry coating to the desired thickness using a doctor blade. Once cast, the green tape is dried of the liquid carrier from the slurry, and then sintered at elevated temperature (e.g., at temperatures of about 600° C. to 1500° C.) using a time and temperature profile sufficient to sinter the construct as a porous electroactive network.

With reference to FIGS. 3A-D, in various embodiments, pore structure of sintered monolith 310A-D includes through pores that extend from first surface 311 to second surface 312. For instance, monolith 310A-D having a combination of through pores and open pores. In various embodiments, the porous preformed monolith does not have through pores; for instance, a majority of the pore volume (e.g., at least 90%) is composed of open pores that do not extend through. In various embodiments, the sintered electrode has a thickness from about 10 microns to 1000 microns; for example, from 20 to 100 µm, from 100-200 µm, from 200-300 µm, from 300-500 µm, from 500-750 µm, from 750-1000 µm. The porosity of the preformed network is generally less than 50%, and typically between 5-10%, or between 10-20%, or between 20-30%, or between 30-40%, or between 40-50%. In various embodiments, first surface 111 and second surface 112 are substantially parallel and flat. The area capacity of the electroactive network typically ranges from 0.5 mAh/$cm^2$ to 10 mAh/$cm^2$, for example between 0.5-1 mAh/$cm^2$, between 1 to 2 mAh/$cm^2$, between 2 to 3 mAh/$cm^2$. The electroactive network may be formed as a porous construct by partial sintering of electroactive material and/or by sintering active materials in the presence of a pore former. The partially sintered electroactive network can be sufficiently formed to effectuate a fully connected porous network that is of sufficient strength to withstand further processing such as glassy embedding when forming the electrode assembly structure, as described in more detail below.

In various embodiments, the desired pore structure of may be achieved by partial sintering and controlling the particle size and particle size distribution of the active material particles used for making the green construct or tape (i.e., a pre-sintered layer). The porosity of the layer may be varied along the depth of the electroactive layer by applying multiple coatings when making the green tape (i.e., using multilayer tape casting). For example, each layer of the multilayer tape may be coated using a slurry having active material particles of different size and dimension. For instance, the first layer may be coated from a large particle size slurry to effect large pores and yield more void volume near the backplane of the electrode structure and the final layer, near the first surface, coated with a smaller particle size slurry, leading to higher fraction of electroactive material nearby the first surface. In other embodiments, sintered preformed electroactive network may be sintered to achieve a first pore structure and first surface microstructure and the sintering operation followed by an engineering operation for creating additional pore features into the network and an engineered microstructure on its first surface, such as by laser structuring, including programmable laser structuring and laser ablation. The engineered microstructures serve to enhance material interlocking at the solid-state interface between the electroactive network and the glassy medium. In various embodiments, tunable sized pores (e.g., vertical pores) are created that extend from the first monolith surface to the second surface. Freeze casting the green construct, is a particularly suitable method for forming one dimensional anisotropic straight through pores. Various lasers may be used to effectuate the desired pore structure, including excimer lasers, ns fiber lasers, and fs-lasers). Using these techniques, the pore structure of the electroactive network and its first surface microstructure can be engineered to improve charging and discharging rates of the electrode, for example by incorporating primary and secondary pore structures within the depth of the electroactive network.

After making a preformed porous electroactive monolith, the next major step for processing the electrode assembly is to infiltrate the pores with glassy sulfide media in a manner that effectuates a continuous glassy medium or can be further processed to the same effect. The structure provides electrokinetic benefit as it effectively increases the active surface area for Li ion transport relative to the planar dimensional area of the monolith. These advantages lead to enhanced power output, reduced charging time and/or improved cycle life. A robust embedded interface with enhanced stability and greater internal pore surface coverage is highly desirable. In accordance with the present disclosure, the properties of the embedded interface may be improved by modifying the chemical makeup of the internal pore surfaces, and, in particular, this may be achieved by providing a protective layer that encapsulates the surfaces with a conformal protective thin film that is Li ion transparent. In various embodiments the protective film stabilizes the interface by acting as a barrier layer between the glassy sulfide media and electroactive material of the network, eliminating oxidation of sulfide to $SO_2$ or sulfidation of the electroactive material, or other mechanisms of interface degradation.

Figure 8:
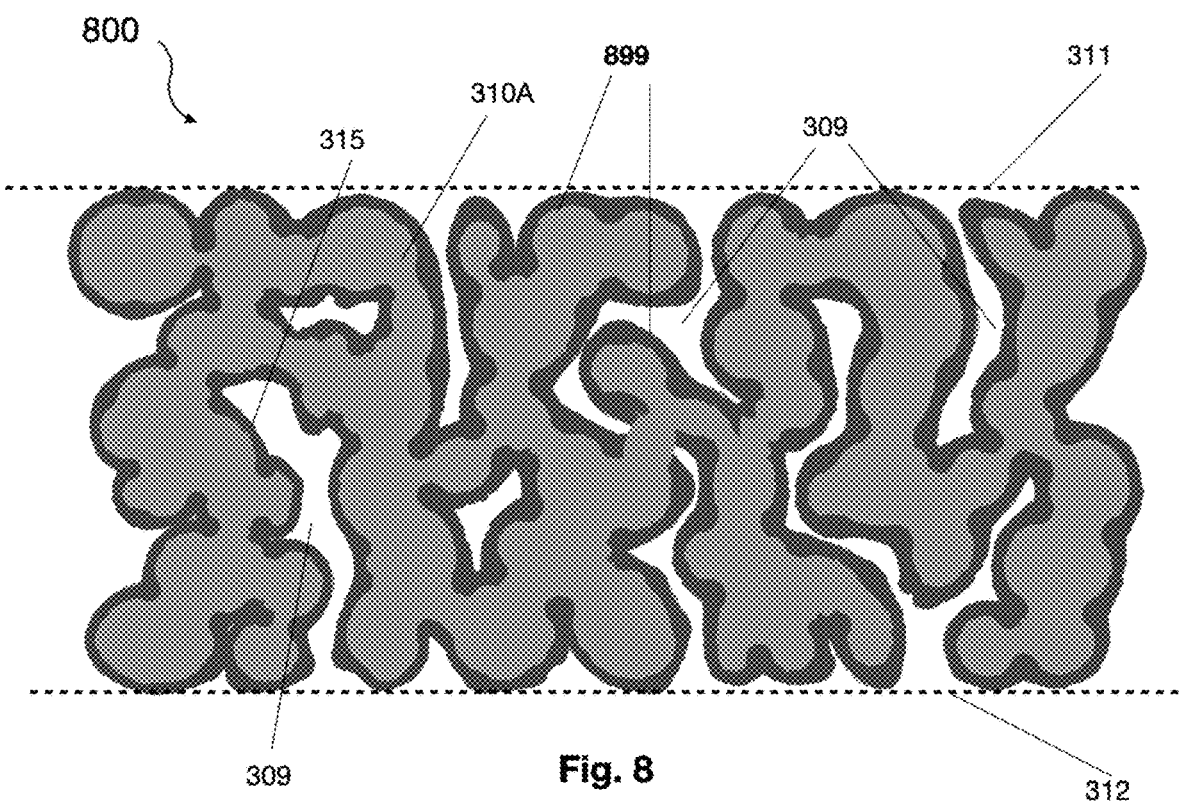
FIG. 8 illustrates a nanofilm protected porous electroactive network, in accordance with various embodiments of the present disclosure.

In FIG. 8 nanofilm protected porous electroactive network 800 is illustrated. Network 800 may be a partially sintered monolith of cathode active material that is protected by nanofilm 899, covering, in direct contact, network internal and external surfaces 315/311, in accordance with various embodiments of the present disclosure. Protective nanofilm 899 is useful for mitigating or eliminating adverse reaction between the electroactive material and the glassy sulfide medium when in direct contact. It may also provide additional benefit in terms of wettability with the sulfide glass during the embedding process. It should be apparent that a protective nanofilm may be incorporated into the various electroactive monolith embodiments that have thus far been depicted throughout the specification. For instance, a protective nanofilm on the surfaces of electroactive network 310A-D shown in FIGS. 3A-D, is generally employed.

Figure 9:
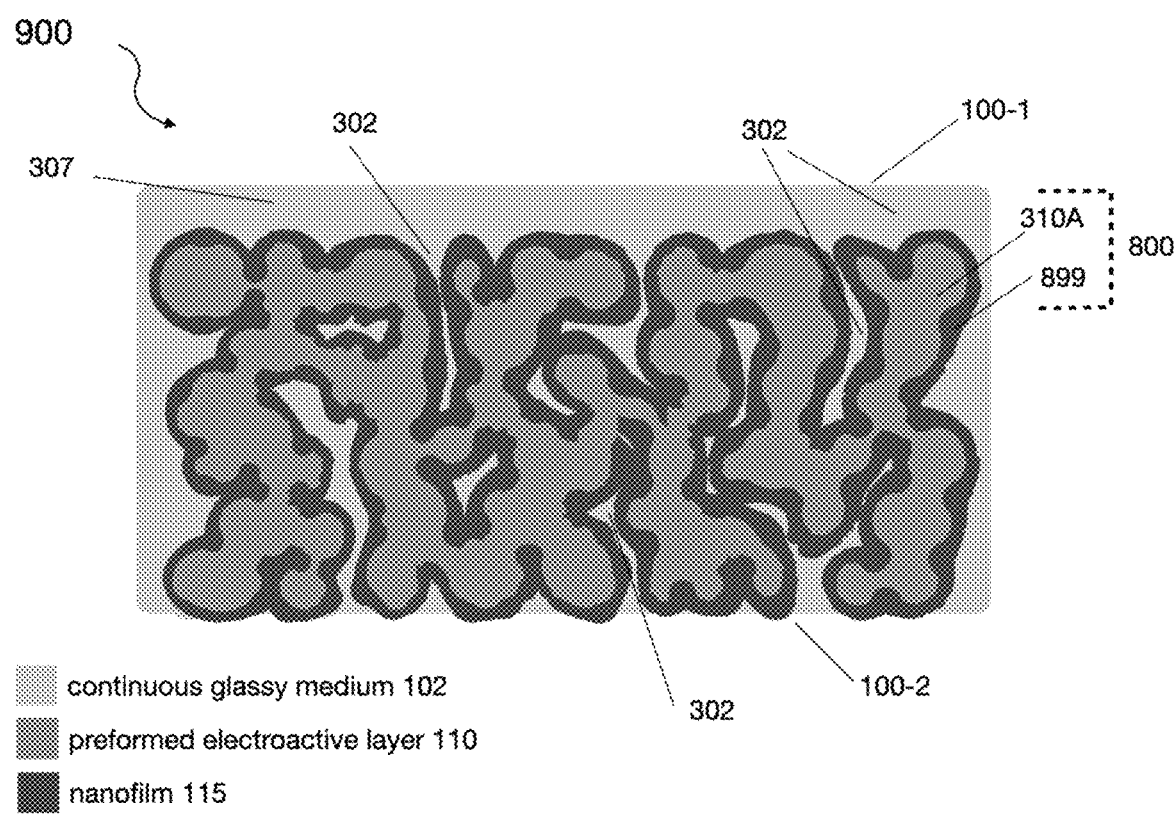
FIG. 9 illustrates a glassy embedded electrode assembly including a glassy continuous sulfide medium embedded into the depth of a nanofilm protected monolith, in accordance with various embodiments of the present disclosure.

In FIG. 7 monolith 310A is shown in its preformed state; in FIG. 8 monolith 310A is shown having conformal protective nanofilm 899 covering internal pore surfaces 315 and major surface 311; and in FIG. 9 glassy embedded electrode assembly 900 is shown, including glassy continuous sulfide medium 302 embedded into the depth of the nanofilm protected monolith 800.

Protective nanofilm 899 is typically of thickness in the range of 1 to 500 nm (e.g., about 1 nm, or about 5 nm, or about 10 nm or about 20 nm or about 50 nm or about 100 nm or about 200 nm or about 300 nm or about 400 nm or about 500 nm). Without limitation, suitable compositions for the nanofilm include lithium metal oxides $Li_2SiO_3$, $Li_4Ti_5O_{12}$, $LiTaO_3$, $LiAlO_2$, $Li_2O$—$ZrO_2$, $LiNbO_3$, and metal oxides, such as $Al_2O_3$, $TiO_2$, $V_2O_5$, and also contemplated are metal phosphates (e.g., manganese phosphate, cobalt phosphate, iron phosphate, and titanium phosphate and metal fluorides (e.g., aluminum fluoride, lithium aluminum fluoride, iron fluoride, and the like). The nanofilm may be formed by chemical vapor deposition, including atomic layer deposition (ALD), as well as other wet chemical methods, including sol gel coating of a nanofilm layer. (e.g., a nanofilm composed of aluminum or niobium and oxygen) using a chemical vapor deposition technique such as atomic layer deposition (ALD) or a wet chemical method for making thin adherent films, such as sol-gel. The nanofilm induces wetting of sulfide glass and its thickness is a tradeoff between providing sufficient surface coverage to protect the active material from adverse sulfidation and maintaining an ion transfer interface across the nanofilm. ALD is particularly applicable as it is a gas phase technique that produces uniform, conformal films from gaseous reactants that enter the passageways and channels of the porous network and the reaction in a self-limiting manner, so it coats the surface with exceptionally thin layer that does not bring about pore blockage. Accordingly, the ALD coated monoliths of the present disclosure, because of both the conformal nature and ability to coat internal pores without clogging, allows for subsequent thorough infiltration of the glassy sulfide media. Accordingly, in various embodiments the nanofilm is coated directly onto the preformed monolith (e.g., by ALD). It is contemplated that the porous electroactive monolith may be processed by sintering an electroactive green body composed of discrete electroactive material particles that are precoated with a protective nanofilm and thus the protective nanolayer is effectuated in-situ with sintering the monolith. In various embodiments both techniques may be employed. The electroactive material particles, prior to sintering, are coated with the protective nanofilm (e.g., by ALD or a wet synthesis approach) and the sintered monolith (with its pore structured already formed) is further processed by ALD to provide additional coverage over surfaces that may have become exposed during sintering or more generally to enhance full coverage, as needed.

Figure 10:
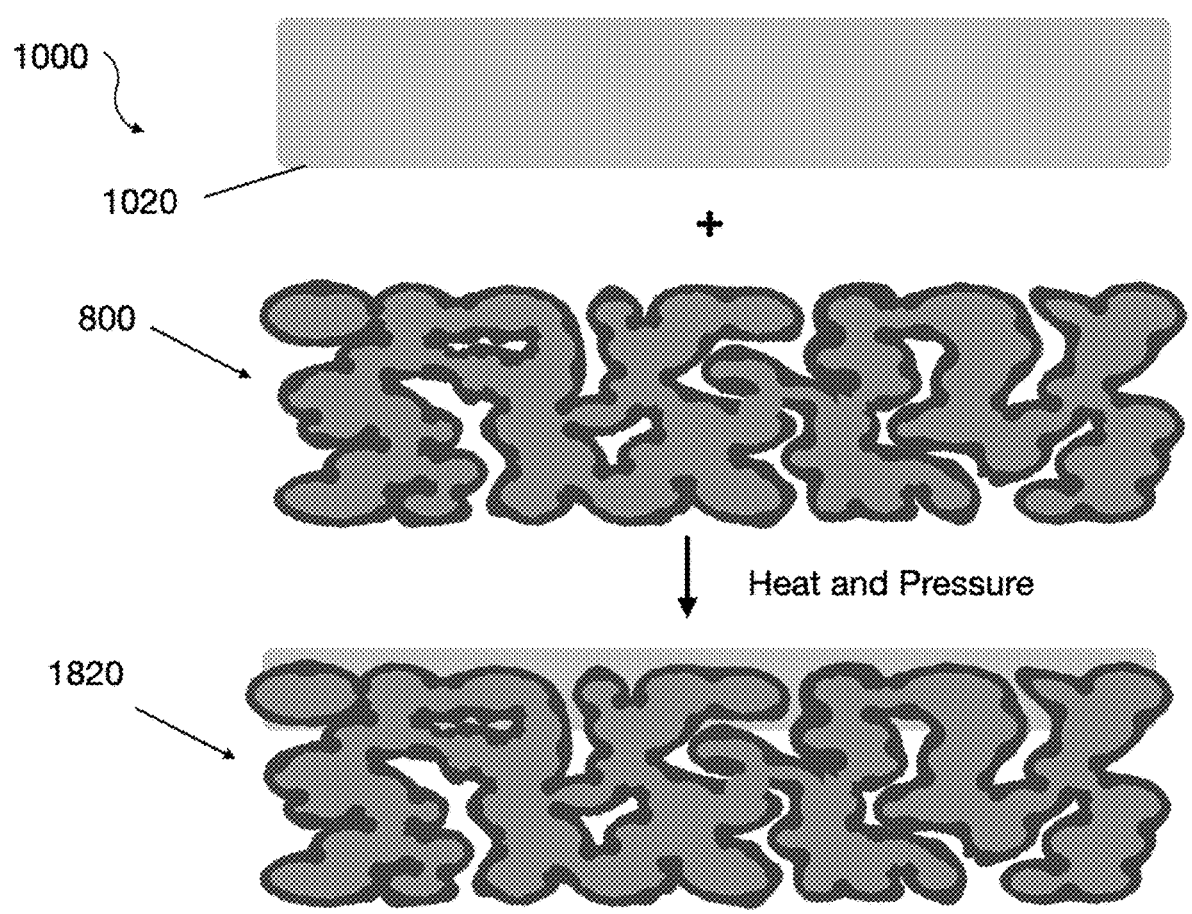
FIG. 10 illustrates a method involving heating a Li-sulfide glass sheet above Tg and pressing it against an electroactive monolith with a pressure sufficient to extrude glass into the pores of the monolith, in accordance with various embodiments of the present disclosure.
Figure 11:
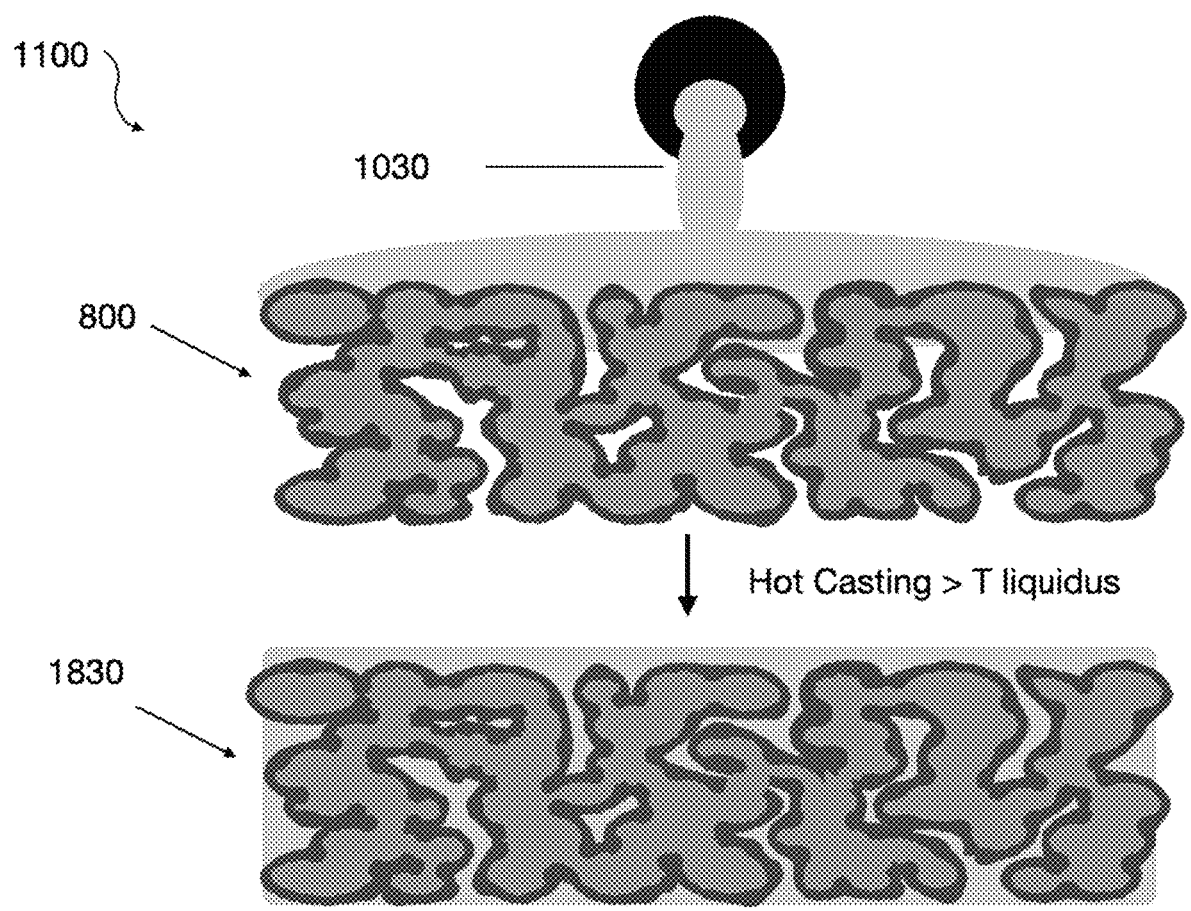
FIG. 11 illustrates a casting method involving heating glass in a crucible to a high temperature sufficient to reduce the glass viscosity to a level for which it will readily flow and infuse into the pores of a monolith, in accordance with various embodiments of the present disclosure.
Figure 12:
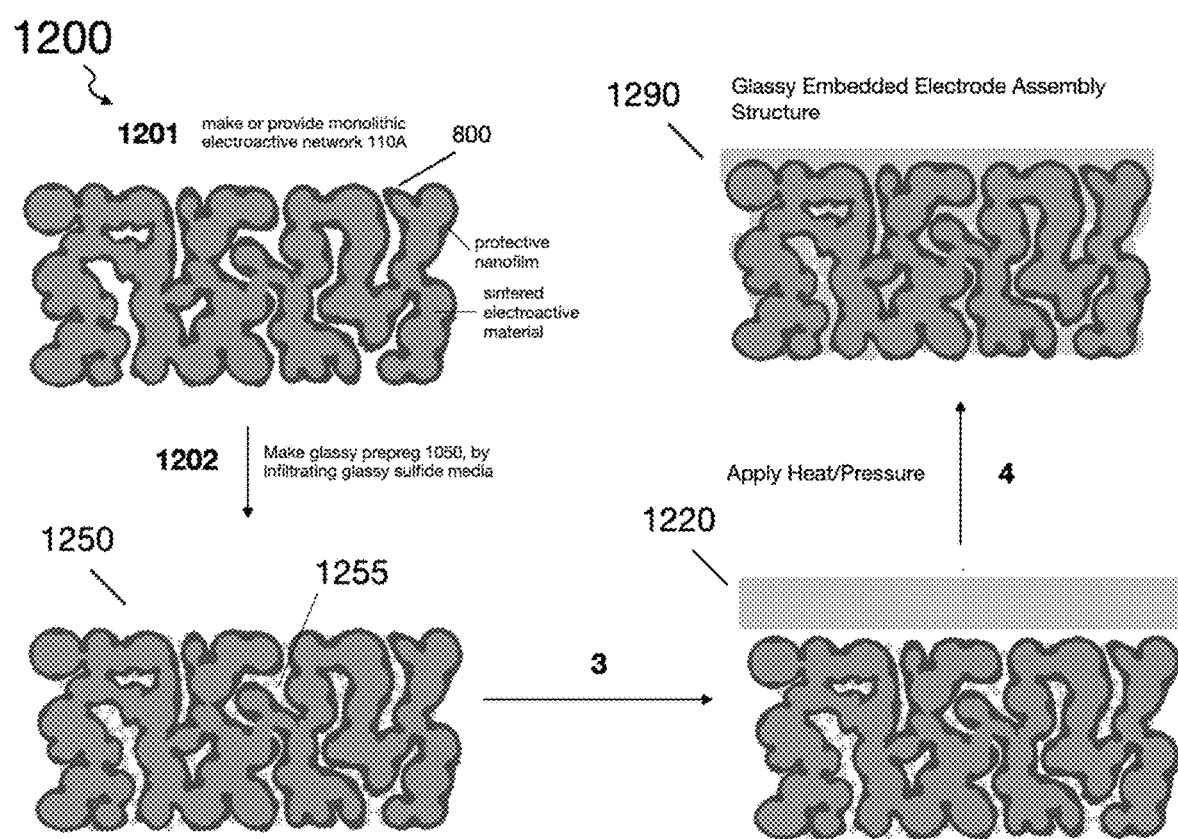
FIG. 12 illustrates a method involving a low temperature approach for making glassy electroactive prepreg at low temperature involving vacuum impregnation of a liquid phase dispersion of Li-sulfide glass particles in a volatile carrier solvent and evaporating the carrier solvent with low to moderate heat, in accordance with various embodiments of the present disclosure.

FIGS. 10-12 illustrate methods for making a glassy embedded electrode assembly that includes glassy embedding a preformed electroactive network, including high and low temperature approaches and processes for infiltrating the glass into the pores of the network. Method 1000 involves heating Li-sulfide glass sheet 1020 and pressing it against monolith 800; method 1100 is a high temperature approach that involves melt casting Li-sulfide glass into the pore structure of the monolith; and preferred method 1200 is a low temperature approach that involves making a "glassy electroactive prepreg" as an intermediate component and heating the prepreg to a temperature that induces viscous sintering (of the glass).

Each method involves initial step 1001 that includes providing or making a preformed porous electroactive network; for example, a partially sintered monolith of cathode active material. In preferred embodiments, the cathode active monolith is nanofilm protected, as illustrated in FIG. 8 (i.e., monolith 800). By incorporating a conformal nanofilm the choice of suitable cathode active materials is expanded to include those that are otherwise incompatible in direct contact with Li-sulfide glasses, and in particular higher voltage cathodes. The nanofilm also provides significant processing advantages against sulfidation of cathode active material in direct contact with hot glass (e.g., above 500 C), and is generally beneficial as a protective layer for lower temperatures processes that involve heating the Li-sulfide glass to temperatures between $T_g$ and $T_c$.

With specific reference to FIG. 10, method 1000 involves heating Li-sulfide glass sheet 1020 above $T_g$ and pressing it against electroactive monolith 800 with a pressure sufficient to extrude glass into the pores of the monolith. Li ion conducting vitreous sulfide glass sheets described in U.S. Pat. No. 10,164,289 are particular suitable herein as sheet 1020. For deep embedding, whereby the glassy medium extends into and throughout the entirety of the monolith pore structure, the glass should have a sufficiently low viscosity to achieve complete extrusion and this step may require elevated temperatures approaching or exceeding the liquidus temperature of the glass, although lower temperatures (between $T_g$ and $T_c$) are also contemplated depending on the glass compositions. In various embodiments, temperatures between $T_g$ and $T_c$ are sufficient for at least a shallow embedding (e.g., the glassy medium extending into the monolith to a depth that is less than 50% of the monolith thickness). The embedding depth or extent can be increased, or the rate of embedding enhanced, by pressure assisting the capillary flow. An electrode assembly with a shallow embedding is particularly suitable for use in a battery cell having a hybrid construction wherein a liquid or gel electrolyte fills the remaining non-embedded pores.

In some embodiments during the impregnation step (or as a separate step) glassy sulfide media particles may be applied as a thin layer onto the monolith major surface (e.g., by spraying a glass particle slurry) followed by viscous sintering of the sprayed glass particle layer, thus forming the encapsulating glassy cover region.

With reference to FIG. 11, casting method 1100 involves heating the glass in a crucible to a high temperature sufficient to reduce the glass viscosity to a level for which it will readily flow and infuse into the monolith pores. Method 1100 is a high temperature approach that involves infiltrating the monolith with molten sulfide glass at or above the liquidus/melt temperature (e.g., above 700° C.). Because it involves hot glass (e.g., above 500° C.), the approach presents several material challenges and therefore generally requires a protective nanofilm that is sufficiently robust to inhibit sulfidation of the electroactive material and oxidation of the glass. Moreover, melt casting requires careful cooling controls to avoid mechanical failure such as cracking the monolith (if cooled too quickly) and undue crystallization of the glass (if cooled too slowly).

In contrast with the complexities of a high temperature approach, in FIG. 12 method 1200 involves a low temperature approach for making glassy electroactive prepreg 1250 at temperatures typically below 100° C., and more typically below 60° C., and in some embodiments below 40° C., or slightly above 20° C. or at about 20° C. The method for making the prepreg involves vacuum impregnation of a liquid phase dispersion of Li-sulfide glass particles 1255 in a volatile carrier solvent and evaporating the carrier solvent with low to moderate heat (e.g., 40° C.-60° C.). Once formed, prepreg 1250 is heated to a temperature sufficient to viscously sinter the glass particles to each other, and thus form glassy medium 302. For creating encapsulating glassy cover region 307, Li-sulfide glass sheet 1220 may be pressed with heat onto the monolith surface where it (sheet 1220) viscously sinters to the impregnated glass particles nearby the monolith surface, whereby the glassy embedded electrode assembly 1290 is formed. Viscous sintering involves heating the prepreg above the glass transition temperature $T_g$ of the impregnated glassy sulfide media particles and preferably below their crystallization temperature $T_c$. For instance, heating prepreg 1250 to viscous sintering temperatures between Tg and Tc. In various embodiments the viscous sintering temperature is less than Tc and no more than about 40° C. greater than $T_g$, no more than about 60° C. greater than $T_g$; no more than about 80° C. greater than $T_g$; no more than about 100° C. greater than $T_g$. For example, the viscous sintering step takes place at a temperature that is above $T_g$, and below $T_c$ by at least 20° C., or by at least 30° C. or by at least 40° C. or by at least 50° C. In various embodiments the viscous sintering step may be pressure assisted by applying an inert gaseous pressure about the prepreg during sintering to enhance flow and wetting and/or otherwise enhance densification of the glassy media. In various embodiments, the glassy prepreg may be viscously sintered using hot isostatic pressing (HIP).

Further in accordance with method 1200, glass impregnation is achieved at low temperature (e.g., room temperature) as opposed to melt infiltration or melt casting which requires heating the glass to a hot molten state at high temperatures above the liquidus or melt temperatures.

When making prepreg 1250, impregnation of Li-sulfide glass particles 1255 may be achieved by vacuum infiltration using a liquid phase dispersion of the glass particles in a volatile carrier solvent and/or evaporating the carrier solvent with low to moderate heat (e.g., 40° C.-60° C.). The glass media loading level is controlled by the impregnation process. In some embodiments, multiple infiltration operations are contemplated. For instance, a first infiltration may be performed using small sulfide glass particles (e.g., <1 μm particle diameter) followed by infiltration using larger sized particles (e.g., >1 μm particle diameter). In various embodiments the aforementioned carrier solvent may be one or more of saturated hydrocarbon, an unsaturated acyclic hydrocarbon, an unsaturated cyclic hydrocarbon, and an organic carbonate.

Particularly suitable saturated hydrocarbons for use as a carrier solvent are straight-chain alkanes $C_5$-$C_{11}$ (e.g., n-Pentane $C_5H_{12}$, n-Hexane $C_6H_{14}$, n-Heptane $C_7H_{16}$, n-Octane $C_8H_{18}$, n-Nonane $C_9H_{20}$, n-Decane $C_{10}H_{22}$, n-Undecane $C_{11}H_{24}$, n-Dodecane $C_{12}H_{26}$); branched-chain alkanes $C_5$-$C_{11}$ (e.g., Isopentane $C_5H_{12}$, Isohexane $C_6H_{14}$, Isoheptane $C_7H_{16}$, Isooctane $C_8H_{18}$, Tetraethylmethane $C_9H_{20}$, Isodecane $C_{10}H_{22}$, 3-Methyldecane $C_{11}H_{24}$); cycloalkanes $C_6$-$C_8$, $C_nH_{2n}$ (e.g., Cyclohexane $C_6H_{12}$, Cycloheptane $C_7H_{14}$, Cyclooctane $C_8H_{16}$).

Particularly suitable unsaturated acyclic hydrocarbons ($C_nH_{2(n-m-1)}$) for use as a carrier solvent are those wherein n is the number of carbon atoms and m is the number of double bonds, such as alkenes ($C_6$-$C_{11}$, $C_nH_{2n}$; stable to alkali metals), including 1-Hexene $C_6H_{12}$, 1-Heptene $C_7H_{14}$, 1-Octene $C_8H_{16}$, 1-Nonene $C_9H_{18}$, 1-Docene $C_{10}H_{20}$, 1-Undecene $C_{11}H_{22}$, and 1-Dodecene $C_{12}H_{24}$; and alkadienes ($C_6$-$C_{12}$, $C_nH_{2n-2}$), including 1,5-Hexadiene $C_6H_{10}$, 2,4-Hexadiene $C_6H_{10}$, 1,6-Heptadiene $C_7H_{12}$, 1,7-Octadiene $C_8H_{14}$, 1,8-Nonadiene $C_9H_{16}$, 1,9-Decadiene $C_{10}H_{18}$, 1,10-Undecadiene $C_nH_{20}$, and 1,11-Dodecadiene $C_{12}H_{22}$.

Particularly suitable unsaturated cyclic hydrocarbons ($C_nH_{2(n-m)}$) for use as a carrier solvent are those wherein n is the number of carbon atoms and m is the number of double bonds such as Cycloalkenes $C_6$-$C_8$, $C_nH_{2n-2}$ (e.g., Cyclohexene $C_6H_{10}$, Cycloheptene $C_7H_{12}$, Cyclooctene $C_8H_{14}$; and Cycloalkadienes $C_6$-$C_8$, $C_nH_{2n-4}$ (e.g., 1,3-Cyclohexadiene $C_6H_8$, 1,4-Cyclohexadiene $C_6H_8$, 1,3-Cycloheptadiene $C_7H_{12}$, 1,3-Cyclooctadiene $C_8H_{14}$).

Particularly suitable organic carbonates for use as a carrier solvent are propylene carbonate (PC) $C_4H_6O_3$, dimethyl carbonate (DMC) $C_3H_6O_3$, ethyl methyl carbonate (EMC) $C_4H_8O_3$, diethyl carbonate (DEC) $C_5H_{10}O_3$.

In alternative embodiments crystalline Li ion conducting media may be infiltrated into the monolith to form a prepreg and in embodiments, a combination of both crystalline and glass sulfide media may be used.

Figure 13:
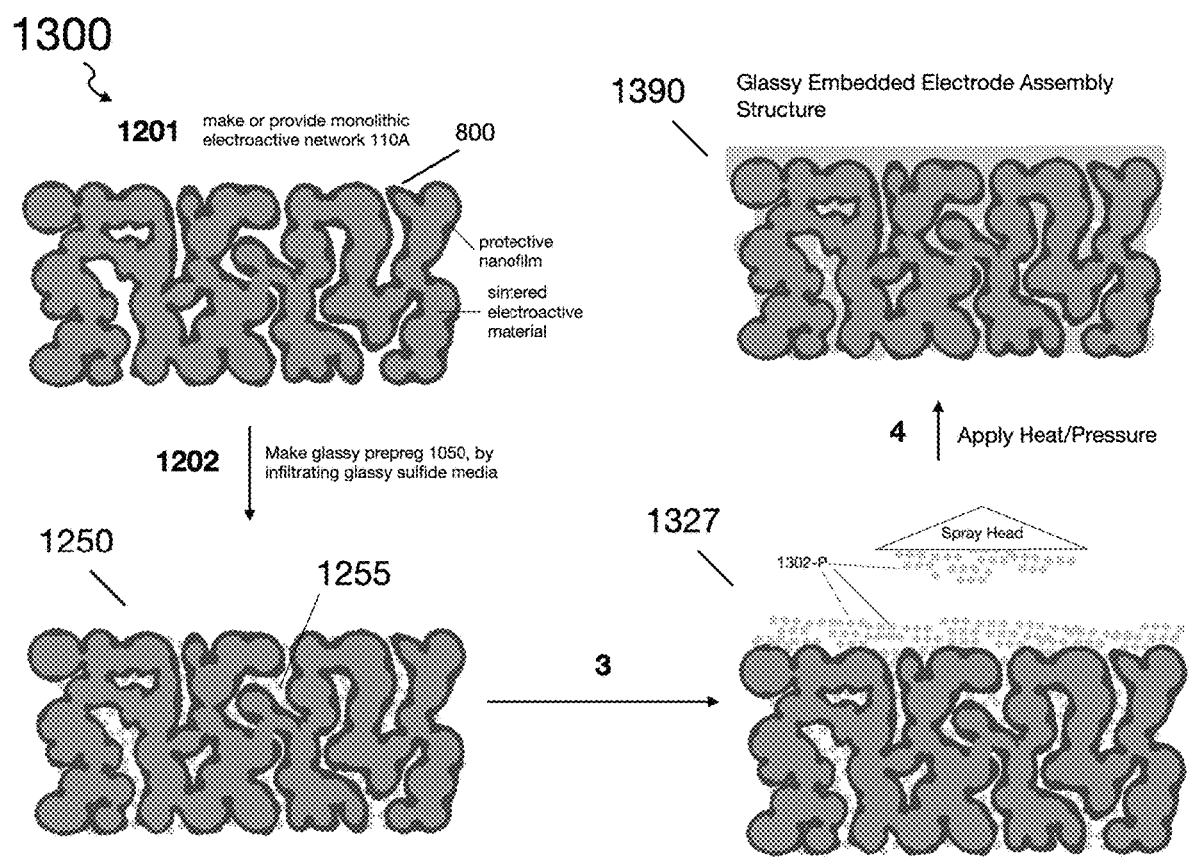
FIG. 13 illustrates another method involving a low temperature approach for making glassy electroactive prepreg at low temperature involving applying glassy sulfide media particles as a thin layer onto the monolith major surface (e.g., by spraying a glass particle slurry) followed by viscous sintering of the applied glass particle layer, thus forming encapsulating glassy cover region, in accordance with various embodiments of the present disclosure.

In FIG. 13 is illustrated another method involving a low temperature approach for making glassy electroactive prepreg at low temperature involving applying glassy sulfide media particles as a thin layer onto the monolith major surface (e.g., by spraying a glass particle slurry) at 1327 followed by viscous sintering of the applied (e.g., sprayed) glass particle layer, thus forming an encapsulating glassy cover region 307 of a glassy embedded electrode assembly 1390, in accordance with various embodiments of the present disclosure.

Figure 14:
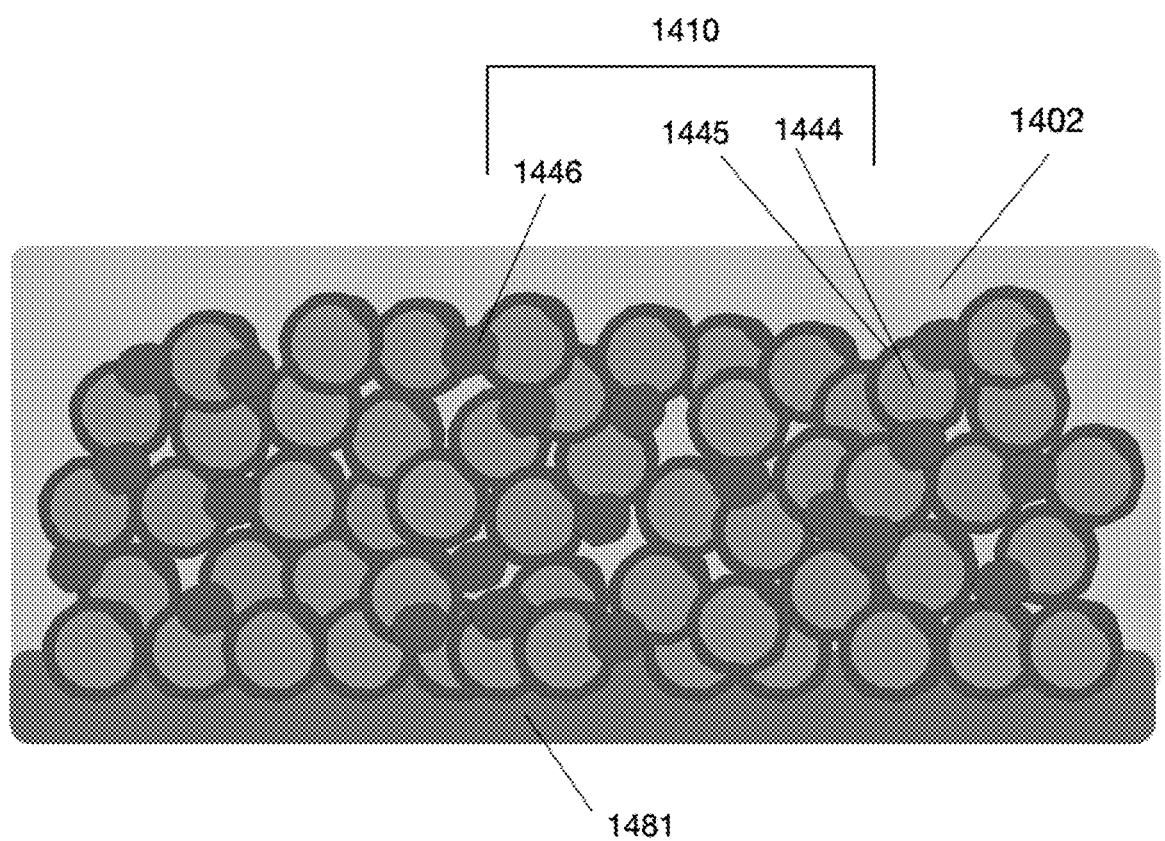
In FIG. 14 illustrates an alternative glassy embedded electrode assembly having a preformed electroactive network layer that is a slurry coated layer of discrete electroactive particles conjoined by binder and formed on current collector layer, in accordance with various embodiments of the present disclosure.

In FIG. 14 alternative glassy embedded electrode assembly 1400 is shown having preformed electroactive network layer 1410 that is not a porous monolith, but a slurry coated layer of discrete electroactive particles 1444 conjoined by binder 1446 and formed on current collector layer 1481. Network 1410 is embedded by glassy medium 302, preferably using a low temperature approach as described above with reference to method 1200. Preferably, binder 1446 is thermally stable for its utility as a binder when heated to $T_g$ of the Li-sulfide glass of which glassy medium 302 is composed, or slightly above $T_g$, or at temperatures slightly below $T_c$. For instance, the binder is preferably stable from room temperature up to at least temperatures approaching 200° C., or 250° C., or 300° C., or to 350° C. and even more preferably thermally stable when heated to 400° C. or greater than 400° C. Network layer 1410 is typically made by casting/coating a slurry of the constituent particles (electroactive material, binder, and an electronically conductive diluent such as carbon fibers, not shown) onto current collector 1481. Electroactive particles (e.g., cathode active material particles) may be individually coated with protective nanofilm 1445 as illustrated. In various embodiments, preformed network 1410 is coated with conformal nanofilm 1445. Once nanofilm coated network 1410 has been formed, it may be embedded by glassy medium 302 using the methods described above in FIGS. 10-12, and in particular the low temperature approach described with reference to FIG. 12.

Figure 15:
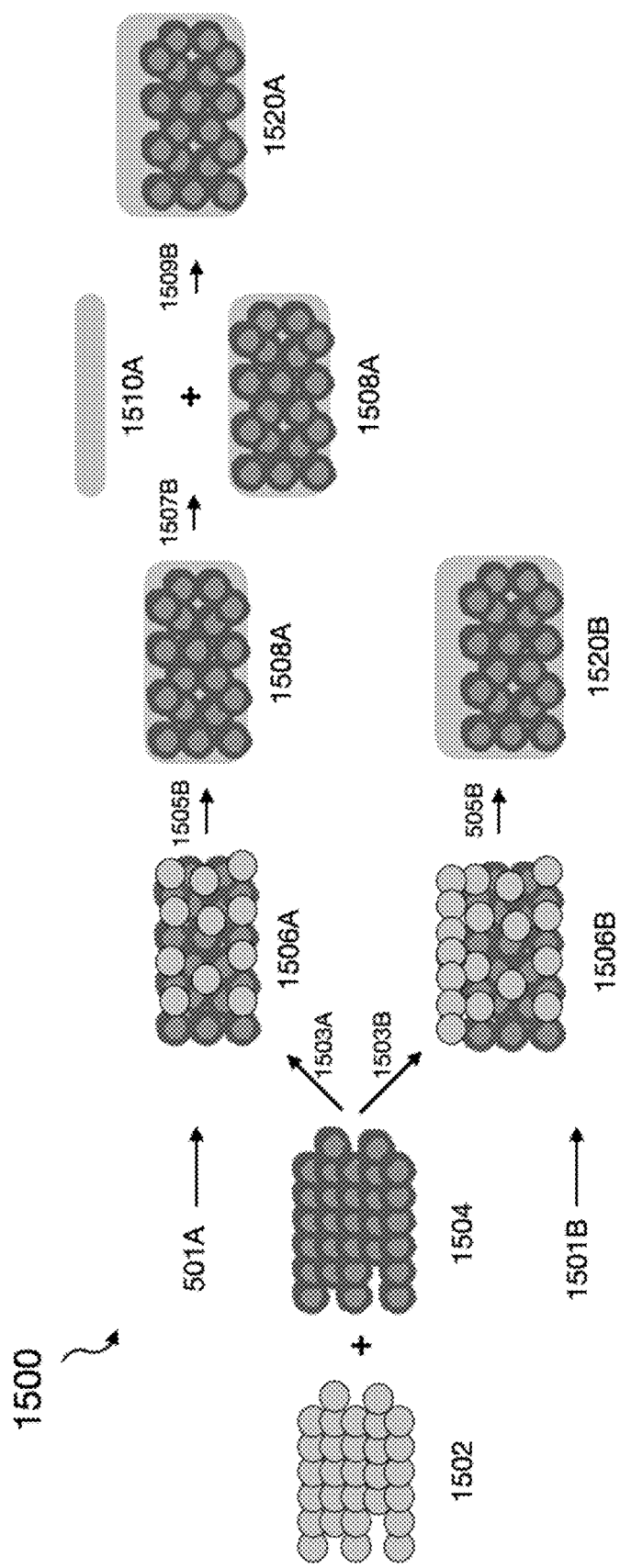
In FIG. 15 illustrates a glassy embedded electrode assembly wherein an electroactive network is formed in-situ along with a glassy medium, in accordance with various embodiments of the present disclosure.

In yet other embodiments the electroactive network is not a discrete preformed body but a contiguous assemblage of electroactive particles that materializes in combination with glassy sulfide media as a result of forming a composite construct therefrom. For example, such a composite construct may be formed by pressing and heating (e.g., via hot isostatic pressing) a mixture of electroactive material particles and Li-sulfide glass particles to form the electroactive network and the continuous glassy medium, interpenetrating. In FIG. 15, a glassy embedded electrode assembly is illustrated wherein the electroactive network is not preformed, but rather formed in-situ along with glassy medium 302. Method 1500 involves providing Li-sulfide glass particles 1502 and nanofilm protected electroactive particles 1504, followed by mixing the particles and pressing to a compact. Compact 1506A is essentially a uniform compact mixture, whereas compact 1506B has a surface cover region of glass media particles above an otherwise substantially uniform bulk region. The compacts are then heated with pressure to form a glassy embedded electrode structure 1508A and 1520B, and in particular embodiments step 1505B involves hot isostatically pressing (HIP) the compacts. The encapsulating cover region may be formed by applying Li ion conducting glass sheet 1510A onto the surface of structure 1508A using heat and pressure, thus forming glassy embedded electrode assembly structure 1520A.

Figure 16:
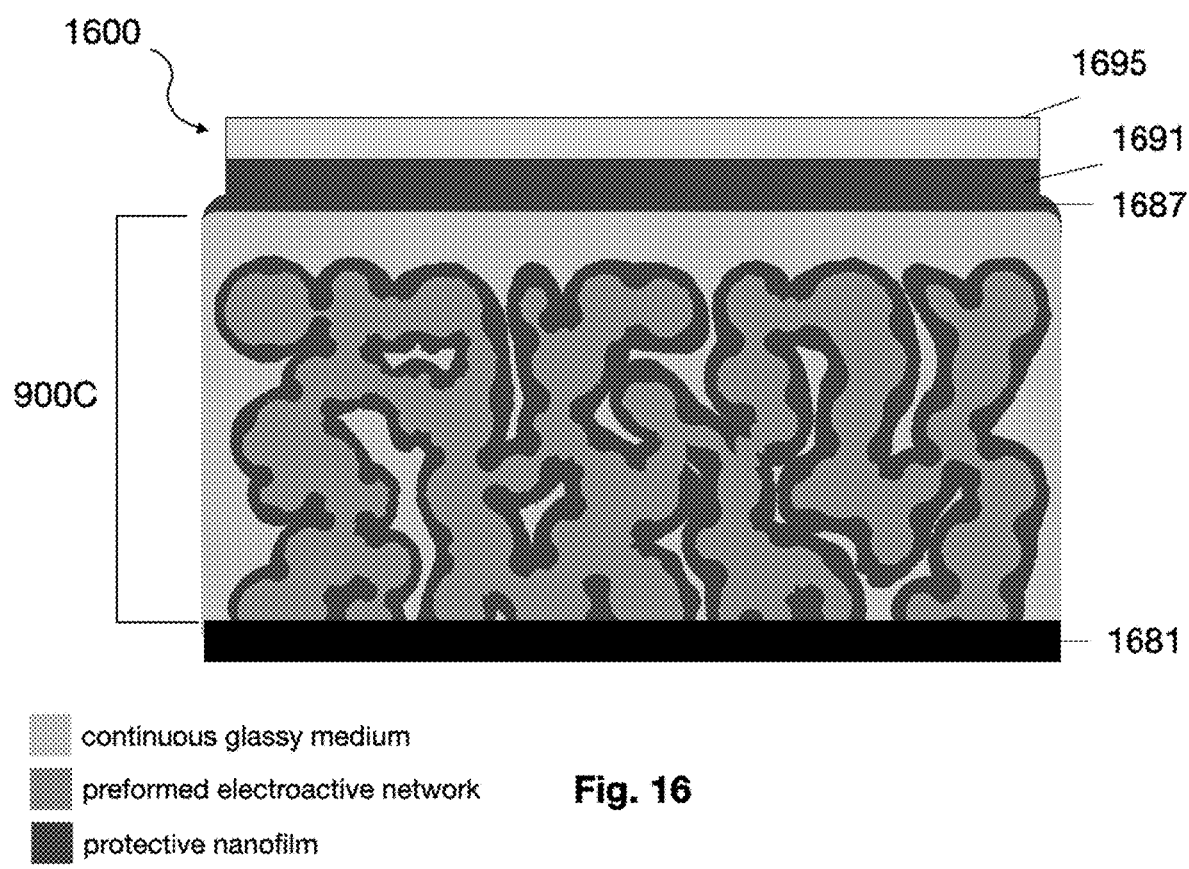
FIG. 16 illustrates a fully solid-state Li metal battery cell in accordance with various embodiments.

In FIG. 16 there is illustrated fully solid-state Li metal battery cell 1600 in accordance with the present disclosure. Cell 1600 includes glassy embedded positive electrode assembly 900 (as illustrated and described with reference to FIG. 9). Electrode assembly 900 first surface 100-1 is coated with tie layer 1687 (e.g., a metal wetting layer) that protects the glassy medium surface against adverse reaction from the external environment and is useful as a layer onto which Li metal layer 1691 may be deposited (e.g., by Li metal evaporation). In various embodiments the tie layer is a metal, semi-metal or some combination thereof, such as a metal/semi-metal alloy or intermetallic. For example, the tie layer may be an aluminum or indium or silver layer. Al current collector 1681 is deposited on electrode assembly second surface 100-2 and Cu current collecting layer 1695 is deposited on Li metal layer 1691. In alternative embodiments the cell may be configured in an anode free configuration, wherein current collecting layer 1695 is deposited onto tie layer 1687. In this embodiment the electroactive network may be a partially sintered monolith of cathode active material of the intercalation type and lithiated (e.g., LCO, NCA, NMC, and the like).

In other embodiments, the electrode assembly may not be made fully dense, and liquid or gel electrolyte may be impregnated into the voids to make a battery cell with a hybrid architecture, wherein liquid electrolyte contacts only one electrode (e.g., the positive electrode). Such a hybrid Li metal battery cell may include a glassy embedded positive electrode assembly that is a partially embedded structure with certain voids that are filled with a gel or liquid electrolyte. In a specific embodiment, the liquid phase electrolyte may be retained inside a solid polymer phase as a gel electrolyte. In various embodiments the method for making the hybrid electrode assembly includes impregnating the glassy embedded electrode assembly structure with a liquid phase comprising a liquid electrolyte and a light or thermally polymerizable monomer that is activated for polymerization after it has been impregnated into the pores of the electroactive network.

CONCLUSION

Although the foregoing disclosure has been described in some detail for purposes of clarity of understanding, it will be apparent that certain changes and modifications may be practiced within the scope of the appended claims. It should be noted that there are many alternative ways of implementing both the process and compositions of the present disclosure. Accordingly, the present embodiments are to be considered as illustrative and not restrictive, and the disclosure is not to be limited to the details given herein.

All references cited herein are incorporated by reference for all purposes.

What is claimed is:

1. A method of making a glass embedded electrode assembly, the method comprising: i) providing a porous electroactive network comprising cathode active material; ii) coating the electroactive network surfaces with a protective nanofilm that covers the cathode active material surfaces; iii) impregnating the pores of the electroactive network with particles of Li ion conducting sulfide glass to form a glassy electroactive prepreg; and heating the prepreg to cause the glass particles to viscously sinter to each other and form a continuous glassy medium interpenetrating with the electroactive network.

2. The method of claim 1 wherein the impregnating takes place at a temperature at or below 60° C.

3. The method of claim 1 wherein the electroactive network is a porous preformed electroactive monolith comprising a cathode active material of intercalation type.

4. The method of claim 1 wherein the electroactive network is a porous preformed electroactive monolith that is a composite material of discrete electroactive particles held together by a binder material that is thermally stable for its utility as a binder when heated to Tg of the glassy medium.

5. The method of claim 4 wherein the discrete electroactive particles are of intercalation type.

6. The method of claim 1 wherein the method of forming the glassy electroactive prepreg comprises:
vacuum impregnating a liquid phase dispersion of Li-sulfide glass particles in a volatile carrier solvent; and
evaporating the carrier solvent.

7. The method of claim 1 wherein the method of forming the glassy electroactive prepreg further comprises applying Li ion conducting glassy sulfide media particles as a thin layer onto a surface of the prepreg, and wherein the heating step causes the thin layer of glassy sulfide media particles to viscously sinter thereby forming an encapsulating glassy cover region.

8. The method of claim 6 wherein the electroactive network is of intercalation type.

9. The method of claim 7 wherein the electroactive network is of intercalation type.

* * * * *